United States Patent
Bender

(10) Patent No.: US 9,875,288 B2
(45) Date of Patent: Jan. 23, 2018

(54) RECURSIVE FILTER ALGORITHMS ON HIERARCHICAL DATA MODELS DESCRIBED FOR THE USE BY THE ATTRIBUTE VALUE DERIVATION

(71) Applicant: Thorsten Bender, Ludwigshafen (DE)

(72) Inventor: Thorsten Bender, Ludwigshafen (DE)

(73) Assignee: SAP SE, Walldorf (DE)

( * ) Notice: Subject to any disclaimer, the term of this patent is extended or adjusted under 35 U.S.C. 154(b) by 525 days.

(21) Appl. No.: 14/556,354

(22) Filed: Dec. 1, 2014

(65) Prior Publication Data

US 2016/0154860 A1    Jun. 2, 2016

(51) Int. Cl.
  *G06F 15/00* (2006.01)
  *G06F 13/00* (2006.01)
  *G06F 17/30* (2006.01)

(52) U.S. Cl.
  CPC .. *G06F 17/30554* (2013.01); *G06F 17/30589* (2013.01)

(58) Field of Classification Search
  CPC ........................... G06F 17/3089; G06Q 10/06
  USPC ................... 715/708, 205, 700, 270
  See application file for complete search history.

(56) References Cited

U.S. PATENT DOCUMENTS

| | | | |
|---|---|---|---|
| 5,651,101 A | 7/1997 | Gotoh et al. | |
| 6,611,840 B1* | 8/2003 | Baer | G06F 17/3089 |
| | | | 707/812 |
| 6,985,905 B2 | 1/2006 | Prompt et al. | |
| 7,111,000 B2 | 9/2006 | Wen et al. | |
| 7,330,853 B2* | 2/2008 | Wayt | G06F 17/30563 |
| 7,801,913 B2 | 9/2010 | Shrivastava et al. | |
| 7,899,833 B2 | 3/2011 | Stevens et al. | |
| 8,290,966 B2 | 10/2012 | Vignet | |
| 8,396,827 B2 | 3/2013 | Gross et al. | |
| 8,498,954 B2 | 7/2013 | Malov et al. | |
| 8,589,777 B1* | 11/2013 | Baer | G06F 17/3089 |
| | | | 705/1.1 |
| 2003/0069737 A1 | 4/2003 | Koubenski et al. | |
| 2004/0015486 A1 | 1/2004 | Liang et al. | |
| 2008/0162616 A1 | 7/2008 | Gross et al. | |
| 2009/0106732 A1 | 4/2009 | Hanson et al. | |
| 2013/0282740 A1 | 10/2013 | Zhou et al. | |

\* cited by examiner

*Primary Examiner* — Kevin Nguyen
(74) *Attorney, Agent, or Firm* — Mintz Levin Cohn Ferris Glovsky and Popeo, P.C.

(57) ABSTRACT

A system, a method, and a computer program product for filtering data stored in a hierarchical data model for use by an attribute value derivation are provided. At least one filtering mechanism to filter at least one instruction containing at least one target attribute value corresponding to at least one source attribute value combination stored in a hierarchical data model is provided. The instruction is filtered using the filtering mechanism. A user interface for displaying the hierarchical data model containing the filtered instruction is generated.

20 Claims, 26 Drawing Sheets

- Filter to show only instructions with manually defined values

- Filter for Source Attributes
  ○ Source Attribute A: Selection Criteria for Source Attribute A
  ○ Source Attribute B: Selection Criteria for Source Attribute B
  ○ Source Attribute C: Selection Criteria for Source Attribute C

- Expand up to a selected Source Attribute

| | |
|---|---|
| Default: | Instruction 1 — Trg. Attrib. Value 1 |
| ᐱ Source Attribute A: Src. Attrib. Value = 'X1' | Instruction 2 — Trg. Attrib. Value 1 |
|   ᐱ Source Attribute B: Src. Attrib. Value = 'ABC1' | Instruction 4 — Trg. Attrib. Value 2 |
|   ᐱ Source Attribute B: Src. Attrib. Value = 'ABC2' | Instruction 5 — Trg. Attrib. Value 3 |
|     ᐱ Source Attribute C: Src. Attrib. Value = 'K' | Instruction 8 — Trg. Attrib. Value 3 |
|     ᐱ Source Attribute C: Src. Attrib. Value = 'L' | Instruction 9 — Trg. Attrib. Value 3 |
| ᐱ Source Attribute A: Src. Attrib. Value = 'X2' | Instruction 3 — Trg. Attrib. Value 1 |
|   ᐱ Source Attribute B: Src. Attrib. Value = 'ABC1' | Instruction 6 — Trg. Attrib. Value 1 |
|   ᐱ Source Attribute B: Src. Attrib. Value = 'ABC3' | Instruction 7 — Trg. Attrib. Value 1 |
|     ᐱ Source Attribute C: Src. Attrib. Value 'K' | Instruction 10 — Trg. Attrib. Value 4 |

FIG. 10b.

- Filter to show only instructions with manually defined values is set
- Filter for Source Attributes
  ○ Source Attribute B starts with 'ABC'
  ○ Source Attribute C equals 'K'

⌄ Default:
   ⌃ Source Attribute A: Src. Attrib. Value = 'X1'   Instruction 1   Trg. Attrib. Value 1
      ⌃ Source Attribute B: Src. Attrib. Value = 'ABC2'   Instruction 2   Trg. Attrib. Value 1
   ⌃ Source Attribute A: Src. Attrib. Value = 'X2'   Instruction 5   Trg. Attrib. Value 3
      ⌃ Source Attribute B: Src. Attrib. Value = 'ABC3'   Instruction 3   Trg. Attrib. Value 1
         ⌃ Source Attribute C: Src. Attrib. Value 'K'   Instruction 7   Trg. Attrib. Value 1
            Instruction 10   Trg. Attrib. Value 4

- Filter to show only instructions with manually defined values
- Filter for Source Attributes
  ○ Product Group: Selection Criteria for Product Group
  ○ Product Category: Selection Criteria for Product Category
  ○ Product Subcategory: Selection Criteria for Product Subcategory
- Expand up to a selected Source Attribute

| Source Attributes: Value | Material Group |
|---|---|
| ⌄ Default: | |
|   ⌄ Product Group: 'X1' | A1 |
|     ⌄ Product Category: 'ABC1' | A1 |
|     ⌄ Product Category: 'ABC2' | A2 |
|       ⌄ Product Subcategory: 'K' | A3 |
|       ⌄ Product Subcategory: 'L' | A3 |
|   ⌄ Product Group: 'X2' | A1 |
|     ⌄ Product Category: 'ABC1' | A1 |
|     ⌄ Product Category: 'ABC3' | A1 |
|       ⌄ Product Subcategory: 'K' | A4 |

- Filter to show only instructions with manually defined values is set
- Filter for Source Attributes
  - Product Category starts with 'ABC'
  - Product Subcategory equals 'K'

| Source Attributes: Value | Material Group |
|---|---|
| ⌄ Default: | A1 |
|   ⌄ Product Group: 'X1' | A1 |
|     ⌄ Product Category: 'ABC2' | A3 |
|   ⌄ Product Group: 'X2' | A1 |
|     ⌄ Product Category: 'ABC3' | A1 |
|       ⌄ Product Subcategory: 'K' | A4 |

- Filter to show only instructions with manually defined values is set
- Filter for Source Attributes
  ○ Product Category starts with 'ABC'
  ○ Product Subcategory equals 'K'
- Expand up to Product Category Source Attributes: Value     Material Group
⋏ Default:     A1
  ⋏ Product Group: 'X1'     A1
    ⋏ Product Category: 'ABC2'     A3
  ⋏ Product Group: 'X2'     A1
    ⋏ Product Category: 'ABC3'     A1

RECURSIVE FILTER ALGORITHMS ON HIERARCHICAL DATA MODELS DESCRIBED FOR THE USE BY THE ATTRIBUTE VALUE DERIVATION

TECHNICAL FIELD

This disclosure relates generally to data processing and, in particular, to providing various filtering mechanisms of data stored in a hierarchical data model for use by an attribute value derivation.

BACKGROUND

In today's world, data is vital to operations of many businesses, whether large or small. On regular basis, businesses rely, use, process and/or store vast amounts of data that can be related to businesses' finances, operations, logistics, customers, and many other aspects of their operations. Proper storage of data and fast access to such data are important to smooth operations of the businesses.

Typically, data is stored using hierarchical data models. A hierarchical data model can be a data model that organizes data into a tree-like structure. The data can be stored as records that are connected using links. In some cases, a record can include a collection of fields containing only one value, where the fields can be defined by an entity type. Typically, the hierarchical data model can include parent records and child records (or nodes), where each child record can have only one parent and each parent can have one or more child records. To retrieve data from a hierarchical database, it is necessary to traverse the entire tree beginning with the root node. This process can be compute intensive and time consuming. Thus, there is a need to provide an ability to obtain and display data in accordance with user preferences that does not create a significant computing burden.

SUMMARY

In some implementations, the current subject matter relates to a computer-implemented method for filtering data stored in a hierarchical data model for use by an attribute value derivation are provided. The method can include providing at least one filtering mechanism to filter at least one instruction containing at least one target attribute value corresponding to at least one source attribute value combination stored in a hierarchical data model, filtering, using the at least one filtering mechanism, the at least one instruction, and generating a user interface for displaying the hierarchical data model containing the at least one filtered instruction. At least one of the providing, the filtering, and the generating can be performed using at least one processor of at least one computing system.

In some implementations, the current subject matter can include one or more of the following optional features. The filtering mechanism can include at least one of the following: a filtering mechanism for displaying at least one directly maintained target attribute value, a filtering mechanism based on at least one source attributes, and a filtering mechanism for expanding a tree of source attributes up to a selected source attribute. The filtering mechanisms can be applied using a predetermined sequence.

In some implementations, the filtering mechanism can be based on at least one of the following algorithms. A first algorithm (which can be an AND-filter described above) for generating a path can retrieve at least one node in the hierarchical data model using a predicate function corresponding to the node. The path can contain a plurality of nodes and end in the at least one node, where each node in the plurality of nodes in the generated path has valid predicate functions. A second algorithm (which can be an OR-filter described above) for generating a path can also retrieve at least one node in the hierarchical data model using a predicate function corresponding to the node. Here, the path can also contain a plurality of nodes and end in the at least one node, but at least one node in the plurality of nodes in the generated path has a valid predicate function. A third algorithm (which can be a level filter described above) for retrieving at least one node in the hierarchical data model can be based on a level of the hierarchical data model containing the node. Any combination of these algorithms can be used to retrieve a node in the hierarchical data model.

In some implementations, the first algorithm can uses at least one of the following: predicate functions of nodes in the generated path containing the plurality of nodes and ending with the at least one node (which corresponds to AND-filter complete paths filtering mechanism), and predicate functions of all nodes on each level of the hierarchical data model, each level containing a node in the generated path (which corresponds to AND-filter all levels filtering mechanism). Using the first algorithm, a node is filtered out when a predicate function of that node has a false value.

In some implementations, the second algorithm can return at least one of the following: a partial path to the at least one node, the partial path containing a node having a predicate function with a true value (which corresponds to an OR-filter partial paths filtering mechanism), and a complete path to the at least one node, the complete path containing each node having a predicate function with a true value (which corresponds to an OR filter complete paths filtering mechanism).

In some implementations, a path generated using the third algorithm can contain nodes located on a plurality of levels in the hierarchical data model. Each level, preceding and inclusive of the level containing the at least one node, can contain nodes having predicate functions with a true value.

The generated user interface can display at least one of the following: the filtered source attribute, the source attribute value corresponding to the filtered source attribute, the source attribute description corresponding to the filtered one source attribute, and a filtered target attribute corresponding to the filtered source attribute.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9 illustrates an exemplary user interface of AVD instruction set that includes filters, according to some implementations of the current subject matter;

FIGS. 10a-d illustrate exemplary implementations of the above filtering mechanism logic to the AVD instruction set shown in FIG. 9, according to some implementations of the current subject matter;

FIGS. 11a-c illustrate exemplary applications of the AVD instructions set filtering mechanism, according to some implementations of the current subject matter;

DETAILED DESCRIPTION

To address these and potentially other deficiencies of currently available solutions, one or more implementations of the current subject matter provide methods, systems, articles or manufacture, and the like that can, among other possible advantages, provide for a user interface for providing various filtering mechanisms of data stored in a hierarchical data model for use by an attribute value derivation.

Figure 1:
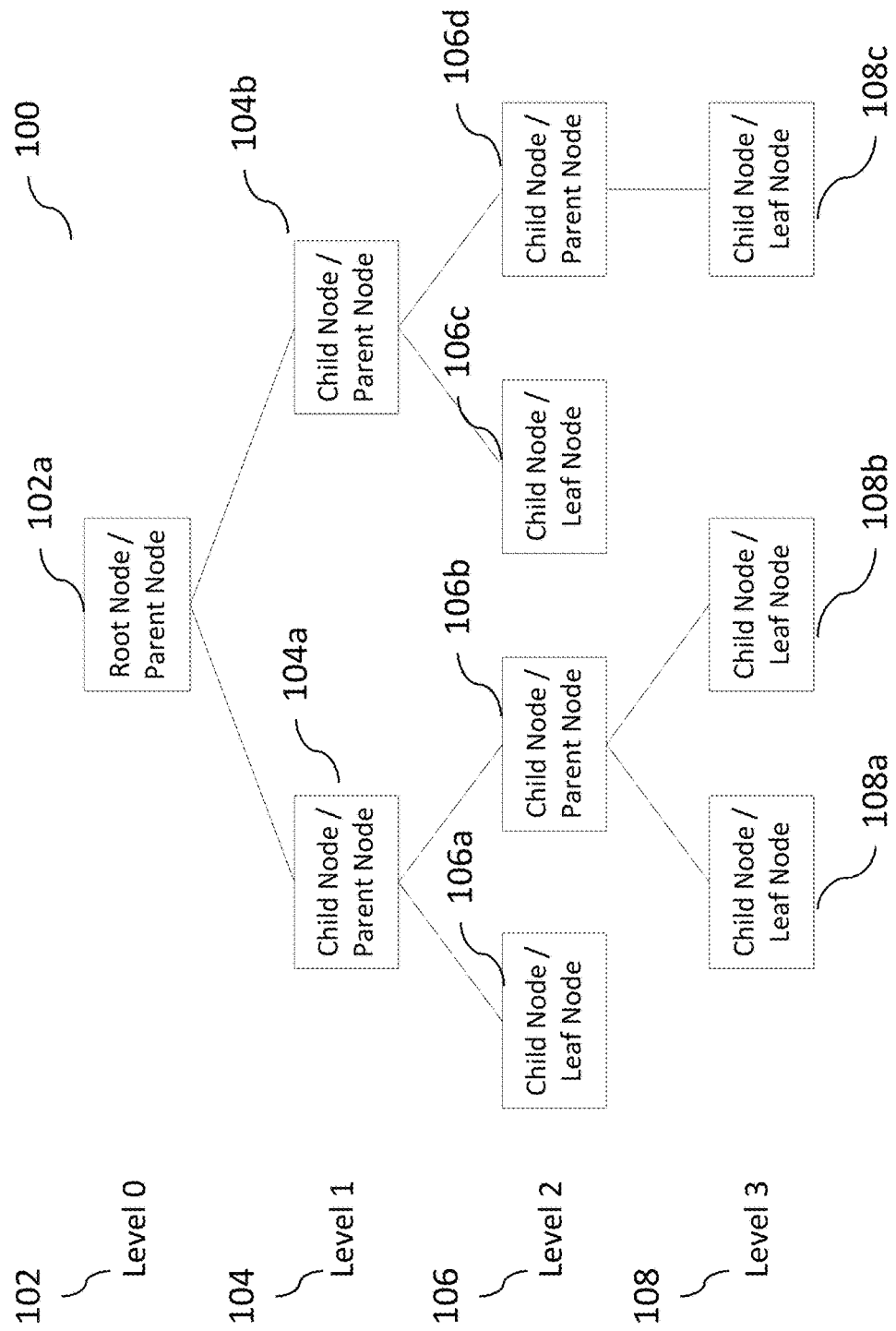
FIG. 1 illustrates an exemplary hierarchical data model, according to some implementations of the current subject matter.

In some implementations, the current subject matter relates to hierarchical data models and ability to maintain attribute values of data stored using a hierarchical data model using an attribute value derivation tool. A hierarchical data model can be a data model in which the data is represented in a tree structure. The elements of the hierarchical data model can be represented by nodes. FIG. 1 illustrates an exemplary hierarchical data model 100, according to some implementations of the current subject matter. The data model 100 can include a plurality of levels 102-108 (i.e., level 0 102, level 1 104, level 2 106, and level 3 108). The data model 100 can allow storage of data at different levels, where the data can be stored in a plurality of nodes. For example, level 0 can include a root or parent node 102a; level 1 can include child nodes/parent nodes 104a and 104b; level 2 can include child nodes/parent nodes 106b, 106d and child nodes/leaf nodes 106a and 106c; level 3 can include child nodes/leaf nodes 108a, 108b, and 108c. A root node 102 typically does not have any parent nodes. A child node can include a parent node and can also include child nodes of its own. A leaf node does not have any child nodes. A child node typically inherits data attributes associated with data that is stored in its parent, grandparent, etc. nodes as well as the root node of the model. Hence, the child node/leaf node 108a can inherit attributes associated with the child node/parent node 106b, child node/parent node 104a, and the root node/parent node 102a.

The nodes in the data model 100 can be connected by branches that can represent parent-child relationship of the nodes. Each parent node can have many child nodes, but each child node has only one parent node. In some implementations, in the data mode, the level can be defined by a hierarchy of nodes and a number of the nodes from the root node down to the leaf nodes. Thus, the level 102 of the root node 102a can be defined as a '0' level; the level 104 of the child nodes 104a-b of the root node 102a can be defined as a level '1'; the level 106 of the child nodes 106a-d of the parent node level 104 can be defined as a level 2; and the level 108 of the child nodes 108a-c of the parent node level 106 can be defined as a level 3.

In some implementations, a path can be defined as a sequence of nodes starting at the root node where the successor of a node is a child of the predecessor node. A path can be called a complete path if it ends at a leaf node and it can be called a partial path if it ends at a non-leaf node. For example, a path from root node 102a to the child node 108a is a complete path. A path from the root node 102a to the child node 106d is a partial path.

In some implementations, the data model 100 can be searched and/or filtered to obtain a specific data set stored in one or more nodes in the data model. A filter can be a function that processes data of a given data structure and returns a new data structure containing a subset of the given data based on a certain filter logic using predicates of the elements of the data structure. The filter function can process data of a hierarchical data model and can return a new hierarchical data model that can include all or a subset of the given data and consider predicate functions on the nodes as well as the level of the nodes in the hierarchical data model. A predicate function (or: predicate) can be a Boolean-valued function p: X→{true, false}, called the predicate on X. In some implementations, the predicate function p can be applied to the node of the hierarchical data model and return a Boolean value.

The attribute value derivation tool can be a generic and reusable tool for rule-based mapping and derivation of data. It can be based on rules for mapping and deriving values for target attributes based on values of source attributes and based on an inheritance logic, which uses default values. The attribute value derivation can provide a user interface to maintain values for the target attributes in a hierarchical set of rules, also called instructions. The values for the target attributes can be defined in a hierarchical set of instructions based on source attribute value combinations of the source attribute hierarchy. The tree structure can include any number of rules.

In some implementations, the current subject matter can provide a user interface that can allow a user to perform various maintenance functions and/or data manipulations of data stored in the hierarchical data model. These functions can effectuate changes of attribute values in the hierarchy of source attribute value combinations. Further, the user interface can provide an overview of the attribute values and the source attribute value combinations of the source attribute hierarchy. The user interface can also allow filtering the rules by given selection criteria, filtering the rules by directly maintained values, and/or expanding the tree of source attributes to a given level. For any of these functions, different recursive filter algorithms can be used.

Figure 2:
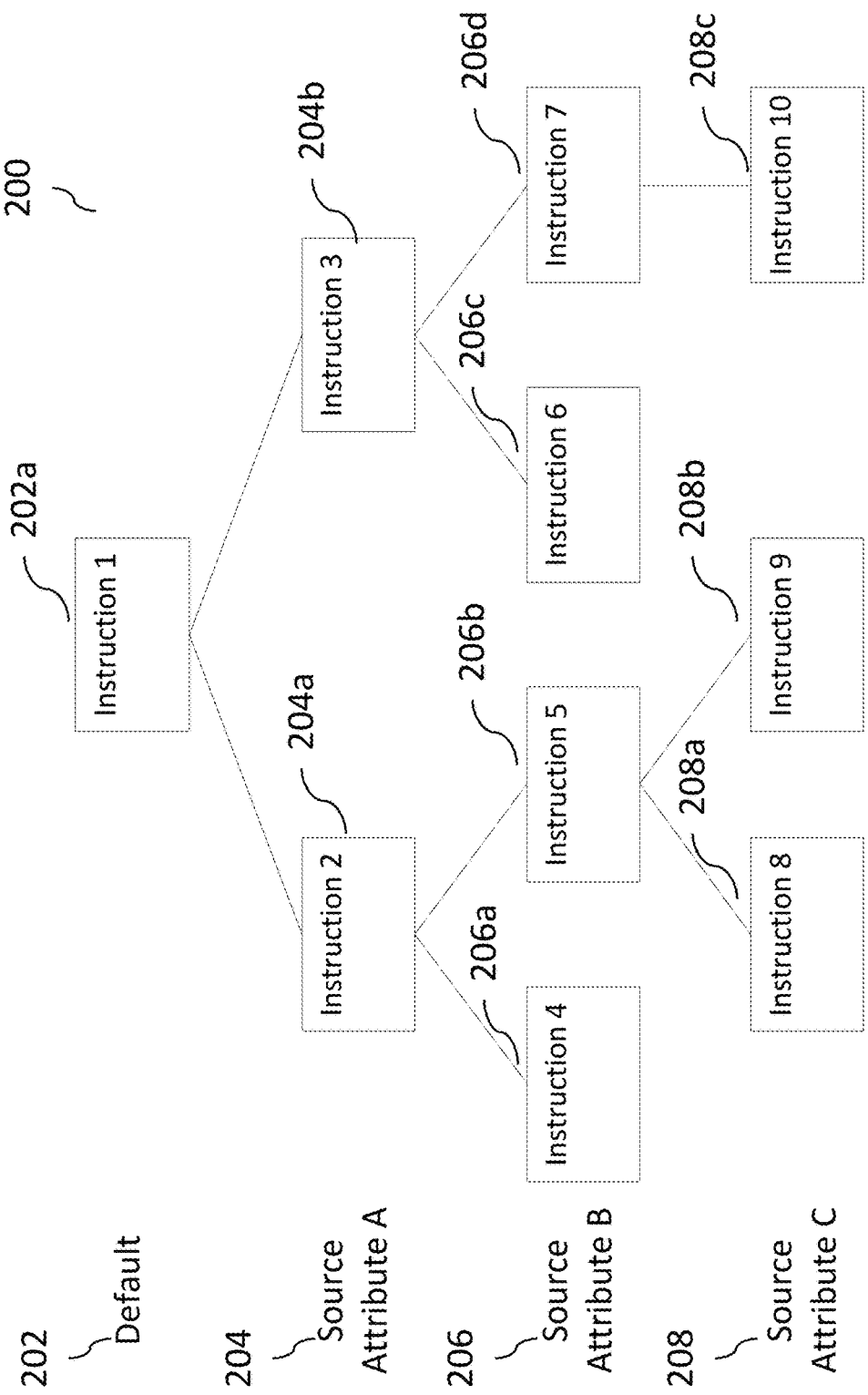
FIG. 2 illustrates an exemplary source attribute hierarchy, according to some implementations of the current subject matter.

FIG. 2 illustrates an exemplary source attribute hierarchy 200, according to some implementations of the current subject matter. The hierarchy 200 can include a default level 202, a source attribute A level 204, a source attribute B level 206, and a source attribute C level 208. The hierarchy can include any number of levels. At each level, there can exist a number of rules or instructions, where child level instructions inherit parent level instructions. As shown in FIG. 2, the default level 202 can include an instruction 1 202a; level 204 can include instruction 2 204a and instruction 3 204b; level 206 can include instruction 3 206a, instruction 4 206b, instruction 5 206c, and instruction 7 206d; level 208 can include instruction 8 208a, instruction 9 208b, and instruction 10 208c. As shown in this figure, instruction 8 208a can inherit instruction 5, instruction 2 and instruction 1. In some implementations, source attributes can be defined in a hierarchy where each level consists of a source attribute to group source attribute value combinations based on a specific value or a grouping such as a selection of source attribute values to individually generate groups of source attribute value combinations.

In some implementations, values for target attributes can be defined in a hierarchical set of instructions, which can be also referred to as an attribute value derivation instruction set ("AVD instruction set"). The definitions of the target attributes can be based on source attribute value combinations of the source attribute hierarchy. Each value of a target attribute of the instruction can be defined by a specific or an explicit value, a reference to a source attribute, or, alternatively can be determined based on a function.

This value can be directly maintained. If it is not directly maintained, then this value can be inherited by the corresponding value of the instruction of the upper level of the source attribute hierarchy. As shown in FIG. 2, the AVD instruction set can include an instruction 202a including overall default values, which can be independent of the values of the source attributes. The AVD instruction set can further include a hierarchical data model where the source attributes (including the groupings) can define a level of the tree (202-208) and the instruction(s) with the source attribute value combinations can define the nodes of the tree (202a-208c). The root node 202a can also be called the default instruction.

Figure 3:
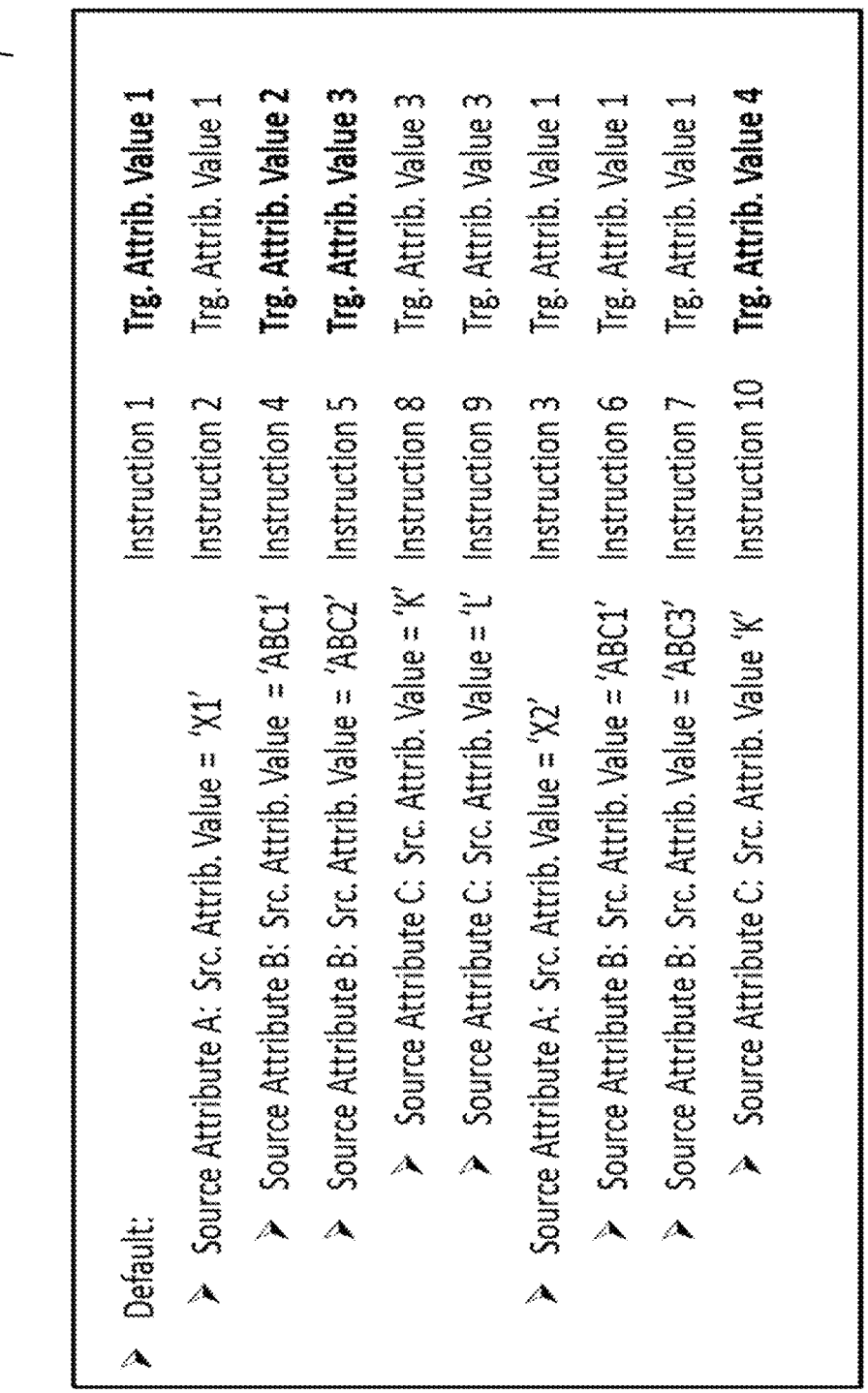
FIG. 3 illustrates an exemplary user interface containing an attribute value derivation instruction set and corresponding to the tree structure shown in FIG. 2, according to some implementations of the current subject matter.

FIG. 3 illustrates an exemplary user interface 300 containing an attribute value derivation instruction set and corresponding to the tree structure 200 shown in FIG. 2, according to some implementations of the current subject matter. The user interface 300 illustrates a tree structure where the source attributes (and/or groupings) can define a level of the tree 200 and the source attribute value combinations and the assigned instruction can define the nodes of the tree 200. The assigned instructions can also define target attribute values (by a directly maintained value (highlighted in bold) or by an inherited value). For example, a directly maintained value can be a target attribute value 1 ("Trg. Attrib. Value 1") corresponding to the default instruction 202a. The directly maintained value can also be target attribute value 2 ("Trg. Attrib. Value 2"), target attribute value 3 ("Trg. Attrib. Value 3"), and target attribute value 4 ("Trg. Attrib. Value 4"). Target attribute value 2 can be defined by instruction 4 206a (as shown in FIG. 2) and can be based on the source attribute B 206 that defines a source attribute value of "ABC1". Target attribute value 3 can be defined by instruction 5 206b (as shown in FIG. 2) and can be based on the source attribute B 206 that defines a source attribute value of "ABC2". Target attribute value 4 can be defined by instruction 10 208c (as shown in FIG. 2) and can be based on the source attribute C 208 that defines a source attribute value of "K". Other target attribute values can be inherited attribute values. For example, a target attribute value defined by instruction 2 204a can be based on the source attribute A having a source attribute value of "X1". This target attribute value can be inherited from the corresponding upper level instruction, i.e., instruction 1, so that the target attribute value 1 ("Trg. Attrib. Value 1") can be used as target attribute value for instruction 2. Examples of other inherited attribute values are shown in FIG. 3.

In some implementations, the current subject matter can provide recursive filter mechanisms for hierarchical data models and uses these filter mechanisms by the attribute value derivation. The filter mechanisms can process data stored in a hierarchical data model and return a subset of data based on predicates on the elements contained the hierarchical data model and/or the level of elements in the hierarchical data model. A predicate function (or: predicate) can be a Boolean-valued function p: X->{true, false}, called the predicate on X. In this context, the predicate function p can be applied to a node of the hierarchical data model and return a Boolean value. This value can be considered in the filter logic. As stated above, the attribute value derivation can use rules to map and derive values for target attributes dependent on values of source attributes and can provide a user interface to maintain these values in a hierarchical set of rules defined for the source attribute value combinations. The user interface can also provide different filter mechanisms. One of these mechanisms can include a filter of the source attribute values, where the rules are filtered using selection criteria, which can be defined for any source attribute(s) of the source attribute hierarchy and which can be applied to the values of the source attributes. Another mechanism can include a filter for directly maintained target attribute values. Here, if this filter is set, then all rules can be displayed, which include at least one directly maintained value. In addition, all corresponding upper level rules can also be shown. A further filter mechanism can include a filter of the source attribute hierarchy level. This filter can define a level so that all rules from the root level down to the given level can be displayed. The following is a discussion of filters that can be used in connection with the attribute value derivation.

In some implementations, different filtering mechanisms or filters can be used to filter data contained in a hierarchical data model. These filters can consider the predicates as well as level(s) of nodes. The current subject matter can be implemented at least one of the following filters: AND-filter (including complete paths and all levels filters) and an OR-filter (including partial paths, complete paths, and a level-filter). The filters can be applied in various combinations, which include at least one of the following: AND-filter and level-filter, OR-filter and level-filter, AND-filter and OR-filter, and AND-filter, OR-filter and level-filter. The filters use recursive retrieval logic for the nodes contained in the hierarchical data model. The recursive logic can retrieve all nodes of the hierarchical data model starting at the root node down to all leaf nodes.

Figure 4:
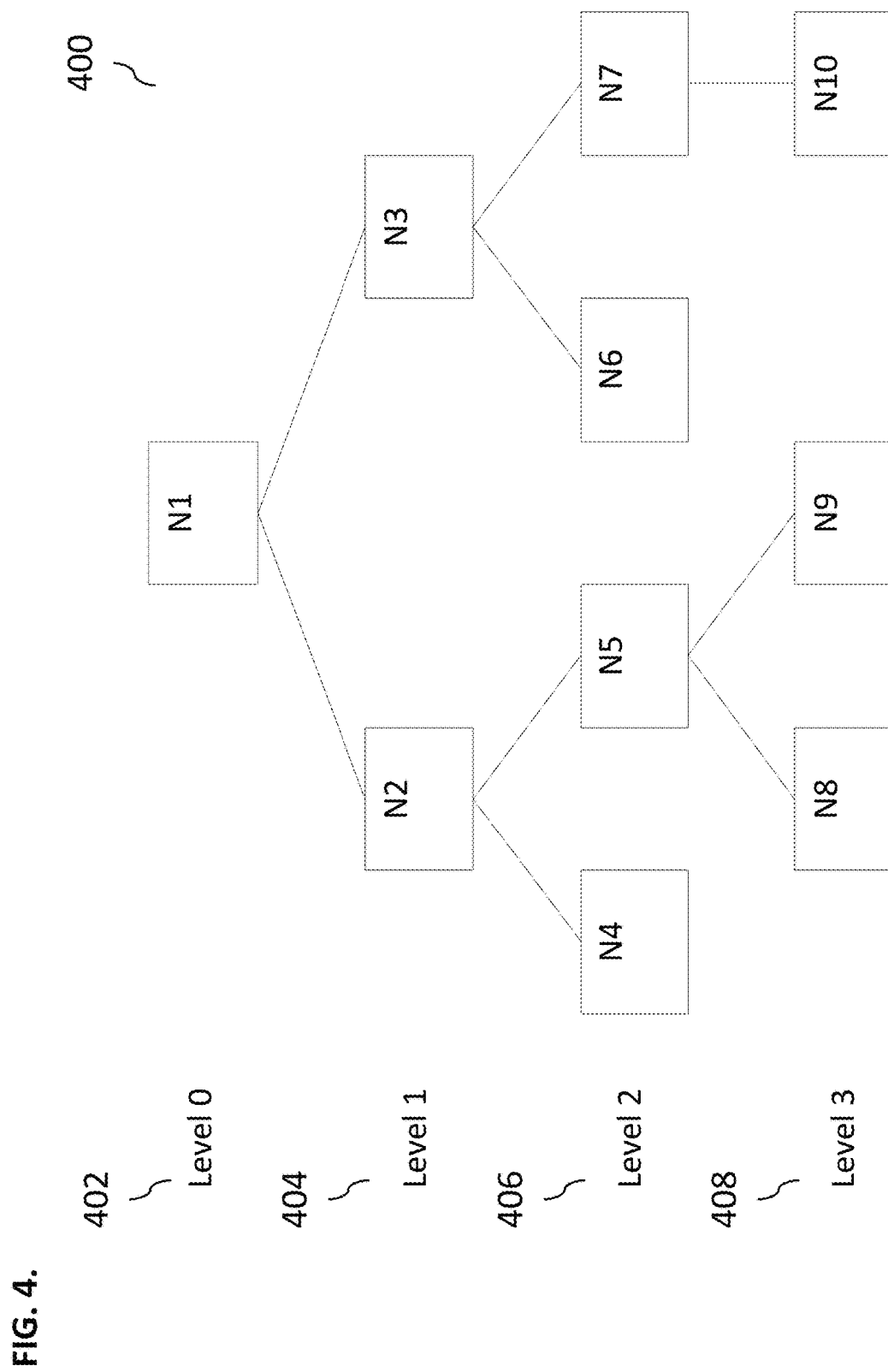
FIG. 4 illustrates an exemplary hierarchical data model that can use recursive logic to retrieve data stored in its nodes, according to some implementations of the current subject matter.

FIG. 4 illustrates an exemplary hierarchical data model 400 that can use recursive logic to retrieve data stored in its nodes, according to some implementations of the current subject matter. The data model 400 can include a level 0 402 node (i.e., a root node N1), a level 1 404 nodes (i.e., parent/child nodes N2, N3), a level 2 406 nodes (i.e., leaf/child nodes N4, N6, and parent/child nodes N5, N7), and level 3 408 nodes (i.e., leaf/child nodes N8, N9, N10).

This retrieval mechanism can be applied to any hierarchical data model of any level and can be implemented by starting with the root node of the data model as the current node in the following way:
    Return current node;
    Determine all child nodes of the current node;
    If there are no child nodes, then exit;
    For all child nodes of the current node: Retrieve all nodes by applying this logic recursively for every child node of the current node;
    Return all retrieved nodes.

Referring to FIG. 4, the above retrieval mechanism can be implemented as follows (an exemplary pseudo-code illustrating this logic is attached hereto as Appendix A1):
    Start with root node N1 as current node;
    Return node N1;
    Determine the child nodes of N1, i.e., N2 and N3;
    Apply the recursive retrieval logic to the nodes N2 and N3:
        Return node N2;
        Determine the child nodes of N2, i.e., N4 and N5;
        Apply the recursive retrieval logic to the nodes N4 and N5
            Return N4;
            Since the node N4 does not have any child nodes, exit;
            Return N5, . . . , and its child nodes N8 and N9;
        Return N3, . . . , and its child nodes N6, N7 and N10.

In some implementations, the AND-filter can be a recursive algorithm for retrieving and filtering nodes of a hierarchical data model subject to predicate functions of the nodes. The result of the predicate functions can include a node that is returned if it belongs to a complete path where all predicate functions (if given) of the nodes of this path return the value 'true'. The path is valid when all node predicates are valid. This logic can be modified in the way that the predicate functions of all levels are considered even if the complete path ends at a level which is not the maximum level of the hierarchy. As stated above, the AND-filter can include two variations: an AND-filter complete paths and AND-filter all levels.

Figure 5A:
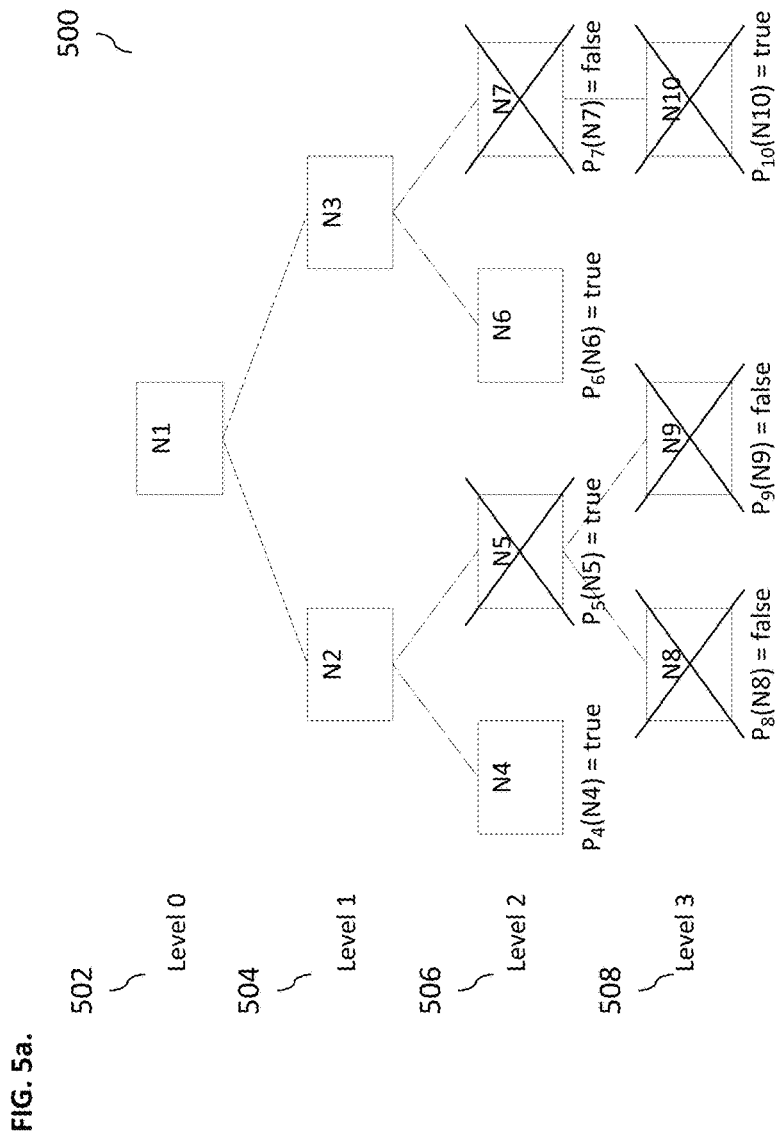
FIGS. 5a-b illustrate operations of exemplary AND-filter filtering mechanism in a hierarchical model, according to some implementations of the current subject matter.
Figure 5B:
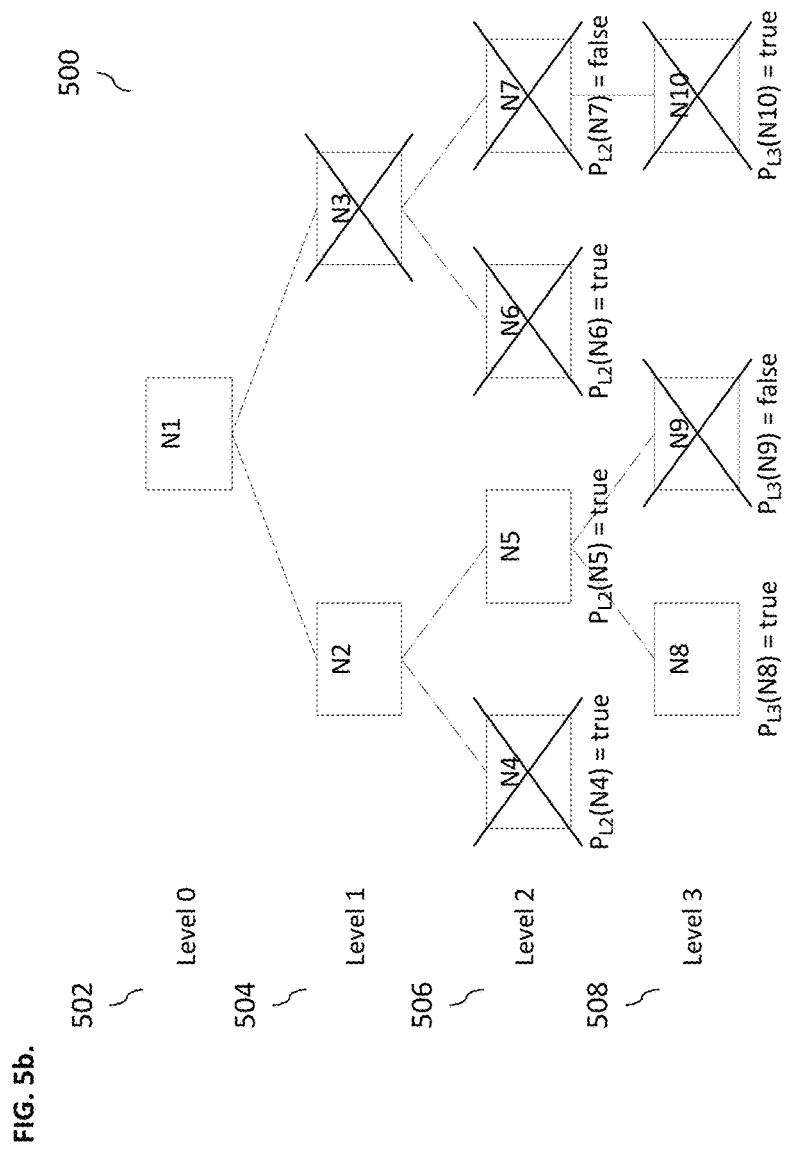

FIGS. 5a-b illustrate operations of exemplary AND-filter filtering mechanism in a hierarchical model 500 (similar to data model 400 shown in FIG. 4) that includes a level 0 502 node (i.e., a root node N1), a level 1 504 nodes (i.e., parent/child nodes N2, N3), a level 2 506 nodes (i.e., leaf/child nodes N4, N6, and parent/child nodes N5, N7), and level 3 508 nodes (i.e., leaf/child nodes N8, N9, N10). FIG. 5a shows an AND-filter complete paths filtering mechanism example and FIG. 5b shows an AND-filter all levels filtering mechanism example.

Referring to FIG. 5a, the AND-filter complete paths filtering mechanism can consider predicate functions of nodes of complete paths of the hierarchical data model. This filter mechanism can filter nodes using the following sequence: a node is filtered out if there is a predicate function given for this node and if the predicate function of the node returns the value 'false'; if a node is filtered out, then all child nodes of this node are also filtered out; and if all child nodes of a node are filtered out, then this node is also filtered out.

The AND-filter complete paths filtering mechanism can return all nodes that belong to at least one complete path for which all nodes either do not have a predicate function set or this predicate function is 'true'. Here, there is no difference if there is no predicate function set for a node or if the predicate function is given for this node and this predicate function returns the value 'true'.

This filtering mechanism can be applied to any hierarchical data model at any level and can be implemented by starting with the root node of the data model as the current node in the following way:
    If AND-predicate of current node='false', then exit;
    determine all child nodes of the current node;
    if there are no child nodes, then return current node and exit;
    For all child nodes of the current node: retrieve all nodes by applying this logic recursively for every child node of the current node;
    If there are nodes returned from these child nodes (=valid nodes), then return current node and return valid child nodes.

Referring to FIG. 5a, the above filtering mechanism can be implemented as follows (an exemplary pseudo-code illustrating this logic is attached hereto as Appendix B1):
    start with root node N1 as current node;
    determine the child nodes of N1, i.e., N2 and N3;
    apply the recursive retrieval logic to the nodes N2 and N3:
        return node N2;
        determine the child nodes of N2, i.e., N4 and N5;
        apply the recursive retrieval logic of N4:
            N4 does not have child nodes: return N4;
        apply the recursive retrieval logic of N5:
            determine child nodes of N5: N8 and N9;
            since the AND-predicate of N8 is 'false' (i.e., $P_8$(N8)=false), exit;
            since the AND-predicate of N9 is 'false' (i.e., $P_9$(N9)=false), exit;
            since there are no valid child nodes of N5 returned (i.e., $P_8$(N8)=false and $P_9$(N9)=false), N5 is also not returned (shown in FIG. 5a as being crossed-out);
        return N2 and N4.
Thus, as a result of this filtering mechanism, the node N3 is processed and the nodes N3 and N6 are returned.

The nodes N7, N8 and N9 are filtered out because the predicate function is 'false' (i.e., $P_7$(N7)=false; $P_8$(N8)=false; and $P_9$(N9)=false, which are shown as crossed out in FIG. 5a). Since node N7 is filtered out, all its child nodes, i.e., node N10, are filtered out (although its predicate function is 'true'). Since all child nodes of node N5, i.e., nodes N8 and N9, are filtered out, the node N5 is also filtered out (although its predicate function is 'true').

FIG. 5b illustrates an example of an AND-filter all levels filtering mechanism. The AND-filter complete paths filtering mechanism logic discussed above can be modified to also consider the predicate functions of all levels in the data model for those paths which do not end at the maximum level of the node hierarchy. For this modified logic, the predicate function can be the same for each hierarchy level. Then, the AND-filter all levels filtering mechanism can be defined using the same filtering logic as the AND-filter complete paths filtering mechanism with the following additional rule: if a node is not at the lowest level of the hierarchy and if there is a predicate function set for at least one level below the level of the given node, then this node is filtered out. Thus, it is assumed that the given node has child nodes down to the lowest level but the predicate function(s) of these child nodes return the value 'false'. Hence, this filtering mechanism is different from the AND-filter complete path filtering mechanism because there is a difference if there is no predicate function set for a node or if the predicate function is given for this node and this predicate function returns the value 'true'.

The AND-filter all levels filtering mechanism can operate as follows (by starting with the root node as the current node):
If AND-predicate of current node='false', then exit;
Determine all child nodes of the current node;
If there are no child nodes, then check if there is a predicate function set for at least one of the lower levels of the current node;
  If this is the case, then exit;
  Otherwise, return current node;
For all child nodes of the current node: Retrieve all nodes by applying this logic recursively for every child node of the current node;
If there are nodes returned from these child nodes (=valid nodes), then return current node and return valid child nodes.

Referring to FIG. 5b, the above filtering mechanism can be implemented as follows (an exemplary pseudo-code illustrating this logic is attached hereto as Appendix B2):
nodes N7 and N9 are filtered out (shown as crossed-out in FIG. 5b) because the predicate function is 'false' (i.e., $P_{L2}(N7)$=false and $P_{L3}(N9)$=false);
since the nodes N4 and N6 (at level 2 506) are not at the lowest level and there is a predicate function set for a lower level, i.e., for level 3 508, the nodes N4 and N6 are filtered out (shown as crossed-out in FIG. 5b);
since node N7 is filtered out, all its child nodes, i.e., node N10 (although its predicate function is 'true'), are filtered out;
since all child nodes of node N3, i.e., nodes N6 and N7, are filtered out, the node N3 is also filtered out (although its predicate function is not set).

Figure 6A:
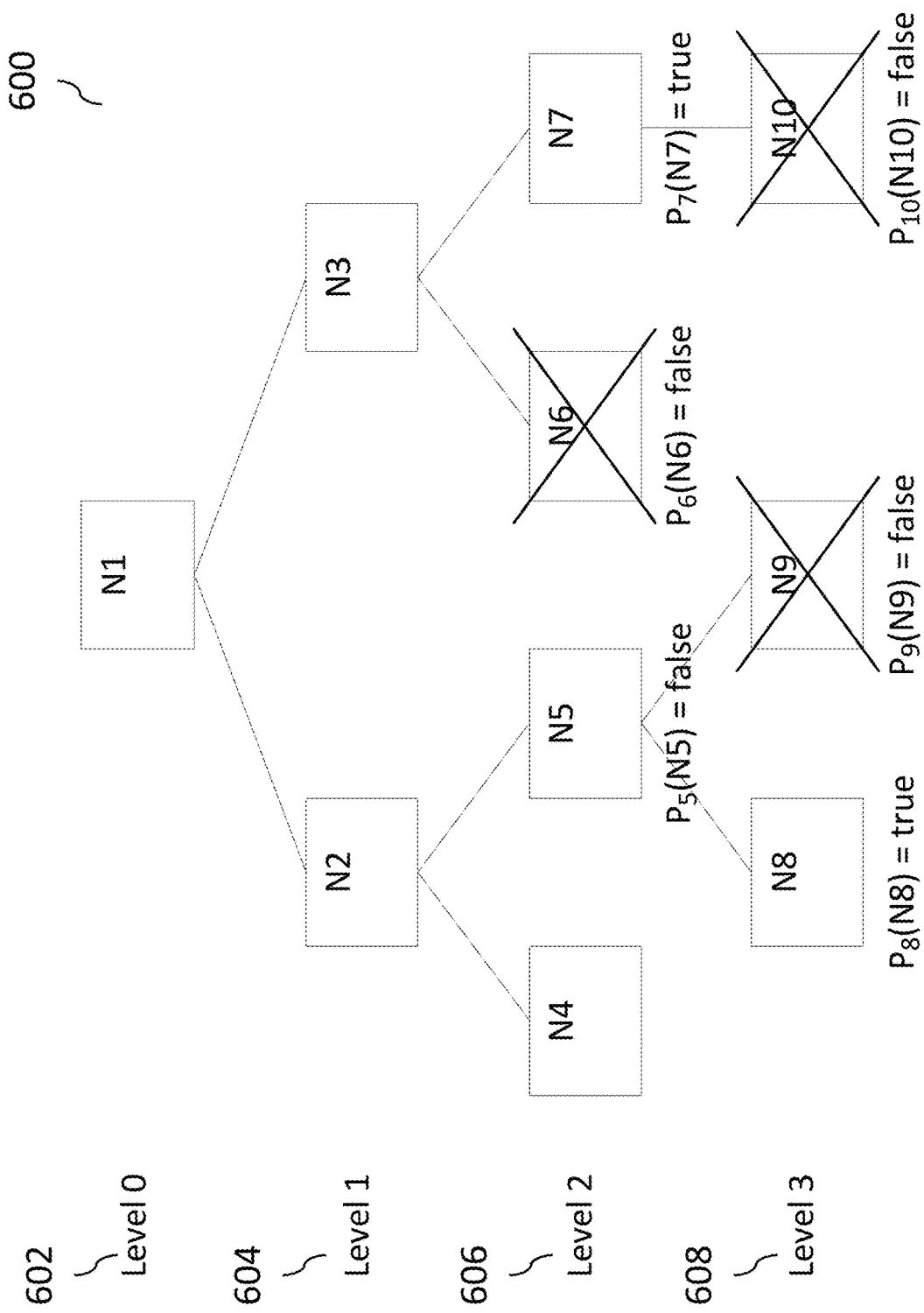
FIGS. 6a-b illustrates an exemplary OR-filter filtering mechanisms in a hierarchical data model, according to some implementations of the current subject matter.
Figure 6B:
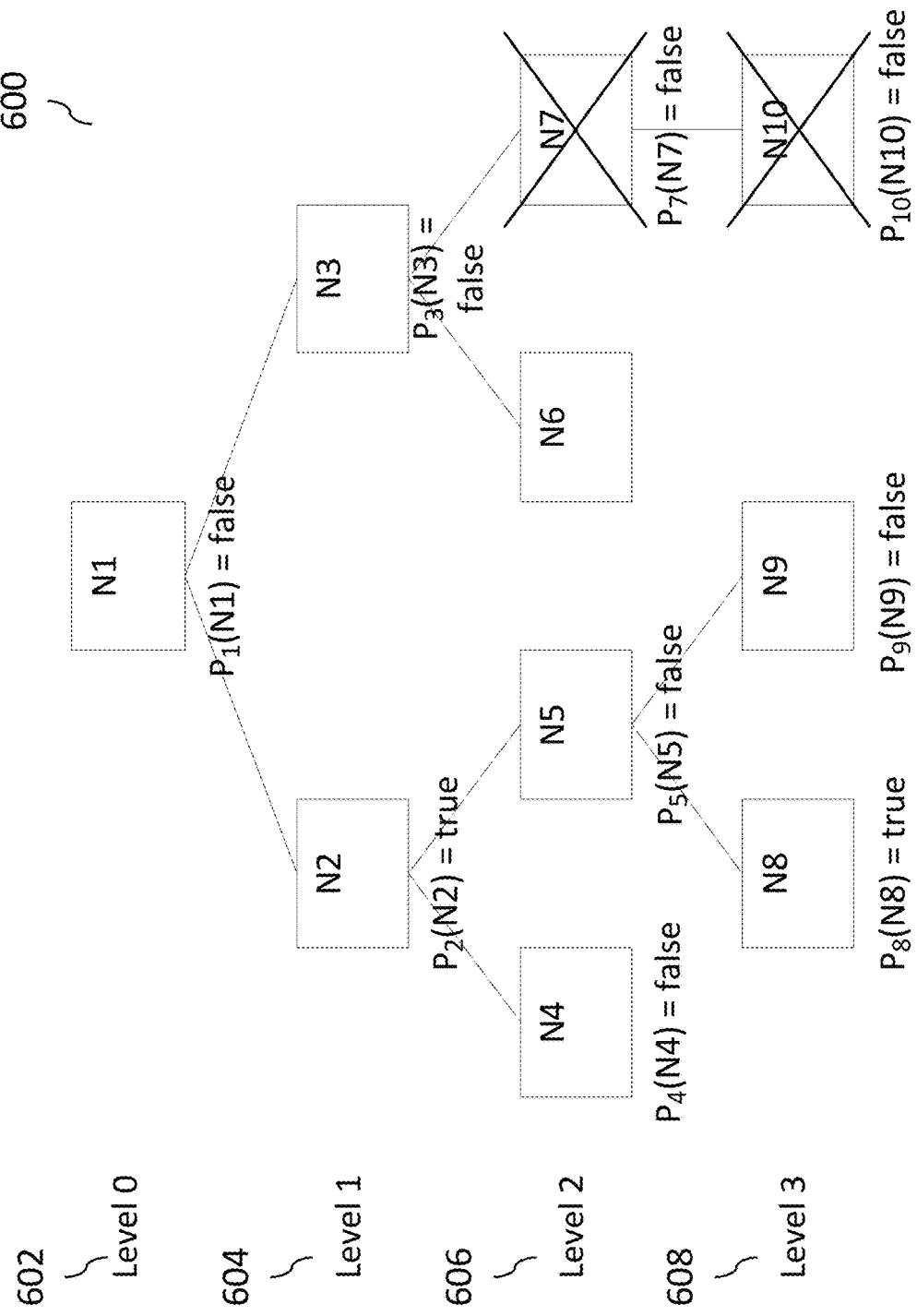

FIGS. 6a-b illustrates exemplary OR-filter filtering mechanisms in a hierarchical data model 600, according to some implementations of the current subject matter. The data model 600 (similar to data models 400 and 500 shown in FIGS. 4 and 5a-b)) includes a level 0 602 node (i.e., a root node N1), a level 1 604 nodes (i.e., parent/child nodes N2, N3), a level 2 606 nodes (i.e., leaf/child nodes N4, N6, and parent/child nodes N5, N7), and level 3 608 nodes (i.e., leaf/child nodes N8, N9, N10). FIG. 6a shows an OR-filter partial paths filtering mechanism example and FIG. 6b shows an OR-filter complete paths filtering mechanism example.

In some implementations, the OR-filter filtering mechanism can retrieve and filter nodes of a hierarchical data model subject to the predicate functions of the nodes. The result of the predicate functions can return a node if it belongs to a path where at least one predicate function of the nodes of this path returns the value 'true'. Thus, using this filtering mechanism, at least one of the node predicates of a path may need to be valid to make all nodes of the path valid.

The OR-filter partial paths filtering mechanism can return only those nodes that belong to at least one of those paths which end at a node that does not have a predicate function set or this predicate function is 'true'. The OR-filter complete paths filtering mechanism can return a complete path if at least one of the nodes of this path has a predicate function with the value 'true'. A predicate function of the OR-filter is referred to as the OR-predicate function.

Referring to FIG. 6a, using the OR-filter partial paths filtering mechanism, a node is not filtered out if there is no predicate function given for the node or if the predicate function of the node returns the value 'true'. If a node is not filtered out, then all its parent nodes up to the root node are also not filtered out (even if their predicate function is 'false'). A node is filtered out if there is a predicate function for the node and this predicate function returns the value 'false' and if there is no child node for which a predicate function returns the value 'true'. In this case, there is no difference if there is no predicate function set for a node or if the predicate function is given for this node and this predicate function returns the value 'true'.

The OR-filter partial paths filtering mechanism can start at the root node as the current node and proceed as follows:
Determine all child nodes of the current node;
If there are no child nodes, then exit;
For all child nodes of the current node: Retrieve all nodes by applying this logic recursively for every child node of the current node;
If there are nodes returned from these child nodes (=valid nodes), then return these nodes and the current node;
Otherwise, return current node if the OR-predicate of the current node is 'true'.

As shown in FIG. 6a, the OR-filter partial paths filtering mechanism can operate as follows (an exemplary pseudo-code illustrating this logic is attached hereto as Appendix C1):
nodes N1, N2, N3, N4, N7 and N8 (not cross-out in FIG. 6a) are not filtered out because these nodes do not have a predicate function set or the predicate function is 'true';
because node N8 is not filtered out, all its parent nodes are also not filtered out, i.e., the nodes N5 (although its predicate function is 'false'), N2 and N1 are not filtered out.

The OR-filter complete paths filtering mechanism can return all complete paths up to leaf nodes if there is at least one positive OR-predicate. In this case, a node is not filtered out if there is no predicate function given for the node or if the predicate function of the node returns the value 'true'. If a node is not filtered out, then all its parent nodes up to the root node as well as all its child nodes are also not filtered out (even if there is a predicate function set for this parent node and this predicate function is 'false'). A node is filtered out if there is a predicate function given for the node and this predicate function returns the value 'false' and if there is neither a parent node nor a child node for which a predicate function returns the value 'true'. Thus, this filtering mechanism can return all nodes that belong to at least one of those paths which end at a leaf node and for which there is at least one node which do not have a predicate function set or this predicate function is 'true'. In this case, this filtering mechanism can operate similarly if there is no predicate function set for a node or if the predicate function is given for this node and this predicate function returns the value 'true'.

In some implementations, the OR-filter complete paths filtering mechanism can start at the root node as the current node and proceed as follows:

Determine all child nodes of the current node;
If there are no child nodes and if the OR-predicate of the given node is 'true' or there is a parent node which has an OR-predicate with value 'true' ('Collect all child nodes'-flag), then return given node and exit;
If the OR-predicate of the given node is 'true' or if the given 'Collect all child nodes'-flag is set, then set (local) 'Collect all child nodes'-flag;
For all child nodes of the current node: Retrieve all nodes by applying this logic recursively for every child node of the current node and with the (local) 'Collect all child nodes'-flag;
If there are nodes returned from these child nodes (=valid nodes), then return these nodes and the current node;
Otherwise, return current node if the OR-predicate of the current node is 'true'.

As shown in FIG. 6b, the OR-filter complete paths filtering mechanism can operate as follows (an exemplary pseudo-code illustrating this logic is attached hereto as Appendix C2):

nodes N2, N6 and N8 are not filtered out because these nodes do not have a predicate function set or the predicate function is 'true';
all parent nodes and all child nodes of these nodes, i.e., the nodes N1, N3, N4, N5 and N9, are also not filtered out (although the predicate functions of these nodes are 'false');
nodes N7 and N10 are filtered out because these nodes do not have parent nodes or child nodes for which the predicate function is set or this predicate function is 'true'.

Figure 7:
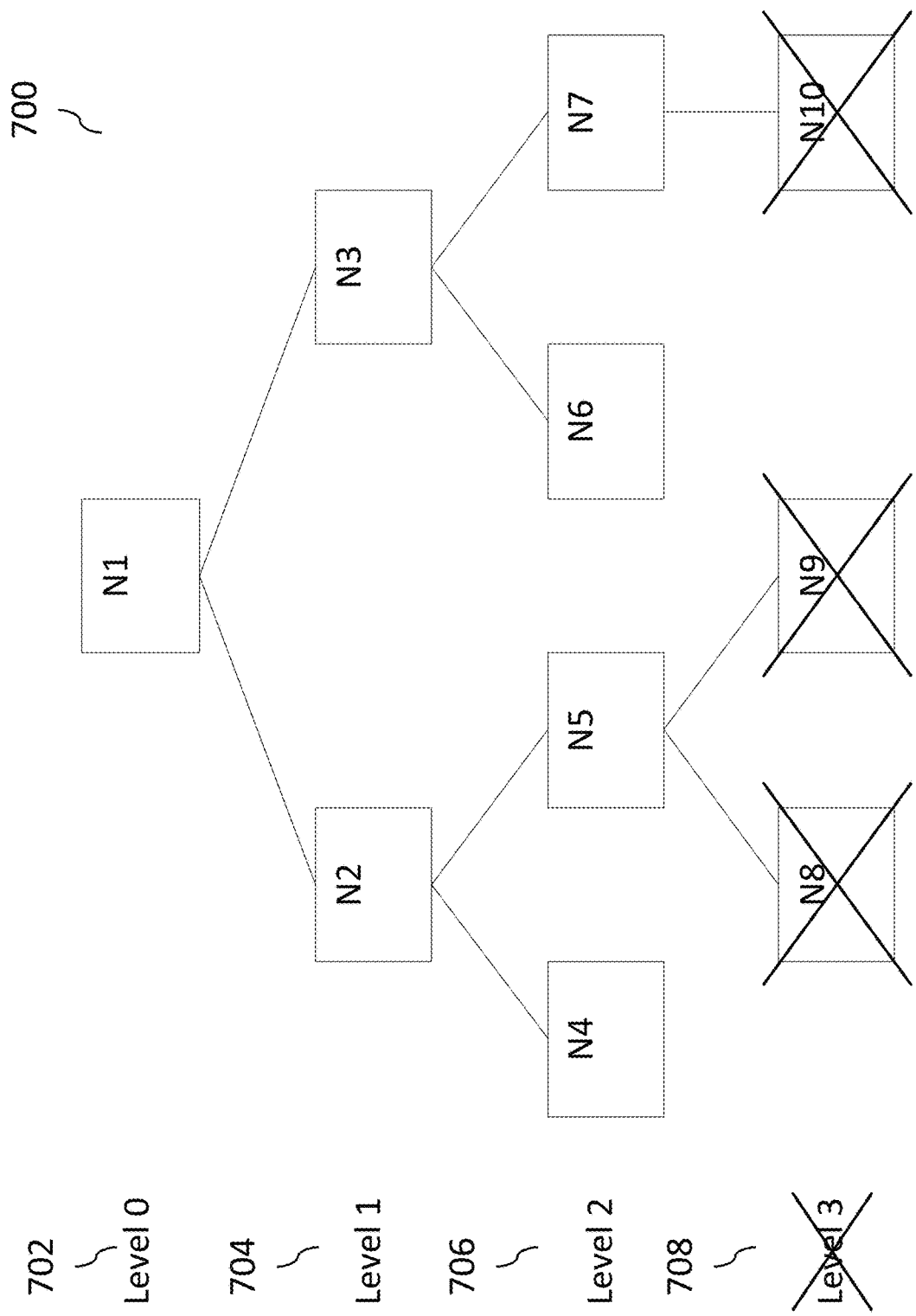
FIG. 7 illustrates an exemplary level-filter filtering mechanisms in a hierarchical data model, according to some implementations of the current subject matter.

FIG. 7 illustrates an exemplary level-filter filtering mechanisms in a hierarchical data model 700, according to some implementations of the current subject matter. The data model 700 (similar to data models 400, 500, 600 shown in FIGS. 4-6b, respectively)) includes a level 0 702 node (i.e., a root node N1), a level 1 704 nodes (i.e., parent/child nodes N2, N3), a level 2 706 nodes (i.e., leaf/child nodes N4, N6, and parent/child nodes N5, N7), and level 3 708 nodes (i.e., leaf/child nodes N8, N9, N10). The level filter filtering mechanism can be a recursive algorithm to retrieve and filter the nodes of a hierarchical data model subject to a given hierarchy level. This filter algorithm can filter the nodes by their hierarchy level. It can be defined using the following logic. All nodes that belong to a level between the root node level (i.e., level '0') down to the given level can be returned. In some implementations, the level filtering mechanism can include similar logic as the OR-filter filtering mechanism where all nodes of a given level can have a predicate function with a value 'true' and child nodes of these nodes can have a predicate function with value 'false'.

In a hierarchical data model, this filtering mechanism can be implemented by starting at a given level and with the root node as the current node.

Return current node;
If the given level='0', then exit;
Reduce level by '1' (=current level);
Determine all child nodes of the current node;
If there are no child nodes, then exit;
If current level='0', then return child nodes and exit;
For all child nodes of the current node: Retrieve all nodes by applying this logic recursively with the current level for every child node of the current node;
Return all retrieved nodes.

FIG. 7 illustrates an exemplary level filtering mechanism for a given level='2' (an exemplary pseudo-code illustrating this logic is attached hereto as Appendix D1):

start with root node N1 as current node;
return node N1;
reduce level by '1': current level='1';
determine child nodes of N1, i.e., N2 and N3;
apply the recursive retrieval logic to the nodes N2 and N3 with current level='1':
return node N2;
reduce level by '1': current level='0';
determine child nodes of N2, i.e., N4 and N5;
current level='0': return nodes N4 and N5 and exit;
return node N3;
reduce level by '1': current level='0';
determine child nodes of N3, i.e., N6 and N7;
current level='0': return nodes N6 and N7 and exit;
return N2, N4, N5, N3, N6 and N7.

As a result of the above filtering, nodes N1, N2, . . . , N7 can be returned because they belong to levels between the root node level '0' down to the given level '2'. Nodes N8, N9, and N10 can be filtered out (shown as crossed-out in FIG. 7) because they belong to a lower level (i.e., level '3').

Figure 8A:
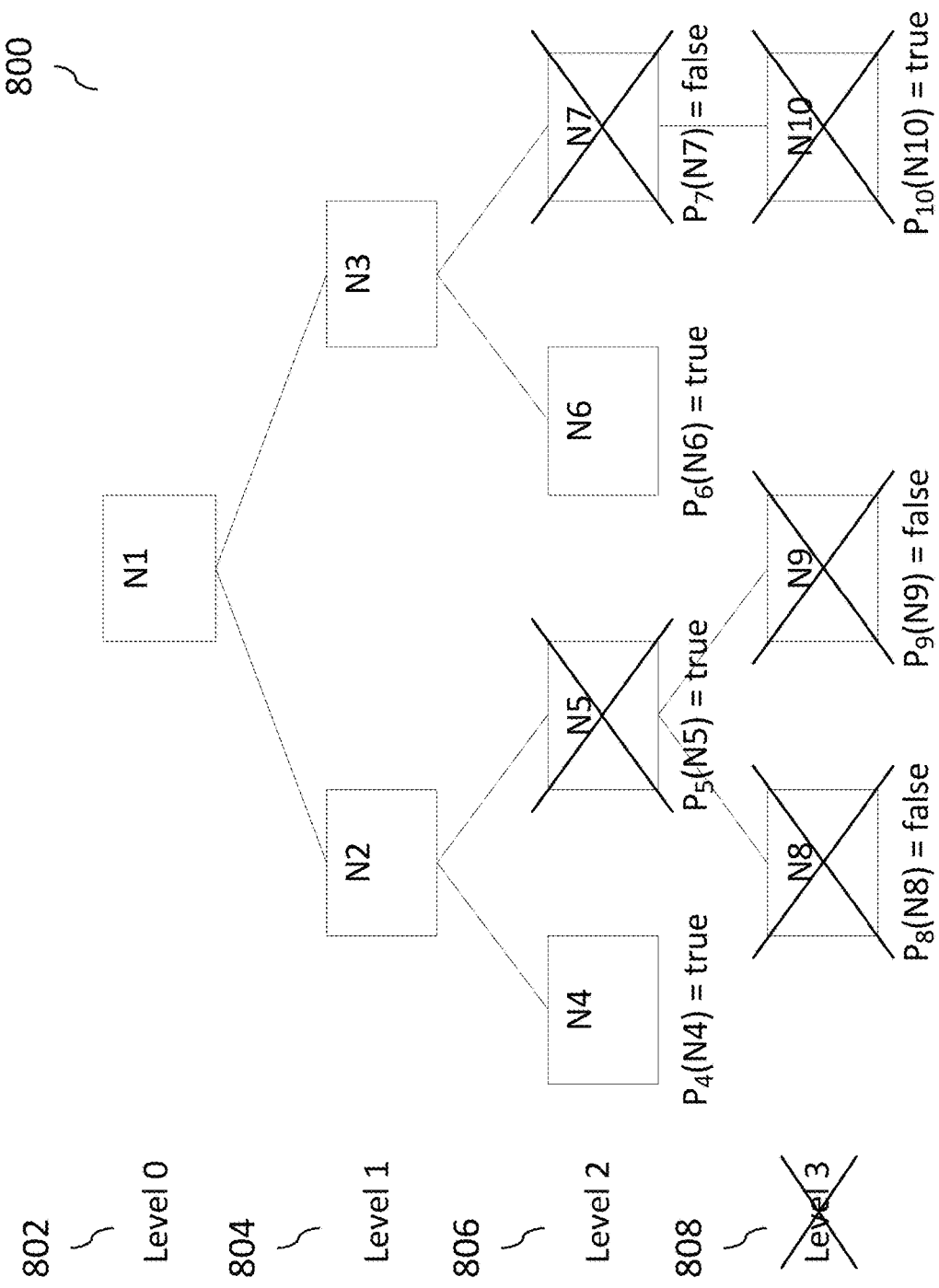
FIGS. 8a-f illustrate exemplary combined filtering mechanisms in a hierarchical data model, according to some implementations of the current subject matter.
Figure 8B:
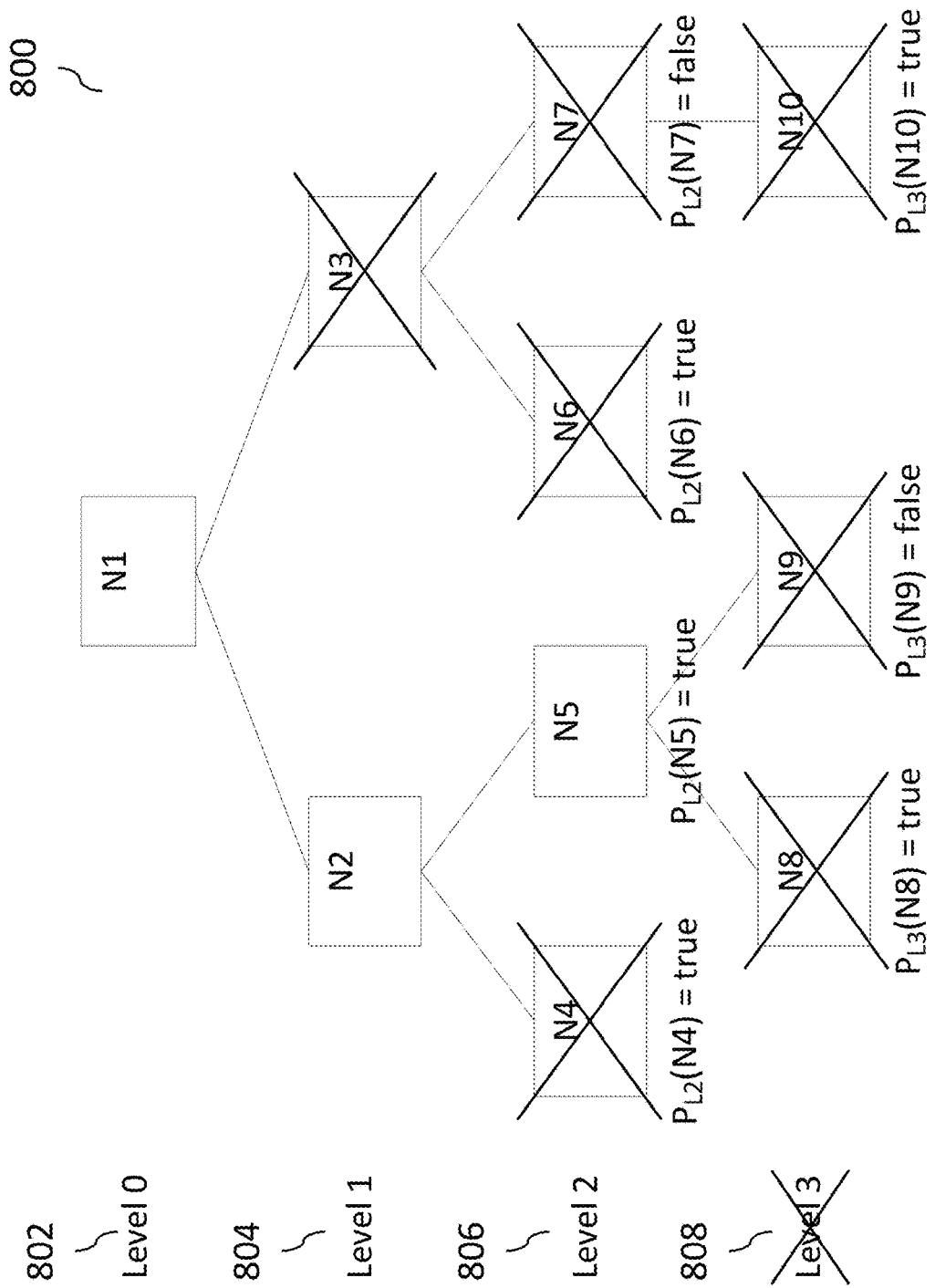

In some implementations, one or more of the above filtering mechanisms can be combined. Some examples of the combined filtering mechanisms can include an AND-filter and level-filter filtering mechanism (as shown in FIGS. 8a-b), an OR-filter and level-filter filtering mechanism (shown in FIGS. 8c-d), an AND-filter and OR-filter filtering mechanism (shown in FIG. 8e), and an AND-filter, OR-filter and level-filter filtering mechanism (shown in FIG. 8f). The following provides a brief overview of each of these combined filtering mechanisms.

FIGS. 8a-f illustrate exemplary combined filtering mechanisms in a hierarchical data model 800, according to some implementations of the current subject matter. The data model 800 (similar to data models 400, 500, 600, 700 shown in FIGS. 4-7, respectively)) includes a level 0 802 node (i.e., a root node N1), a level 1 804 nodes (i.e., parent/child nodes N2, N3), a level 2 806 nodes (i.e., leaf/child nodes N4, N6, and parent/child nodes N5, N7), and level 3 808 nodes (i.e., leaf/child nodes N8, N9, N10).

Referring to FIGS. 8a-b, a combined AND-filter and level-filter filtering mechanism is illustrated. In some implementations, the AND-filter can be applied first, followed by the level-filter as applied on the result of the AND-filter. FIG. 8a illustrates an exemplary combination of AND-filter complete paths with a level-filter filtering mechanism. FIG. 8b illustrates an exemplary combination of AND-filter all levels with a level-filter filtering mechanism.

The combination of the AND-filter complete paths with the level-filter can be performed as follows, starting at the root node as the current node:

If AND-predicate of current node='false', then exit;
If given level='0' and if there is no AND-predicate function set, then return current node and exit;
Reduce level by '1' (=current level);
Determine all child nodes of the current node;
If there are no child nodes, then exit;
For all child nodes of the current node: Retrieve all nodes by applying this logic recursively for every child node of the current node with the current level;

If there are nodes returned from these child nodes (=valid nodes), then return current node and return valid child nodes if given level is greater '0'.

As shown in FIG. 8a, the combined AND-filter complete paths with the level-filter can operate as follows (an exemplary pseudo-code illustrating this logic is attached hereto as Appendix E1):

start with root node N1 as current node;
  return node N1;
  reduce level by '1': current level='1';
  determine child nodes of N1, i.e., N2 and N3;
  apply the recursive retrieval logic to nodes N2 and N3 with current level='1':
    return node N2;
    reduce level by '1': current level='0';
    determine child nodes of N2, i.e., N4 and N5;
    and so on, returning nodes N4, N3 and N6.

As a result of this filtering mechanism, nodes N7, N8 and N9 can be filtered out (shown as crossed-out in FIG. 8a), because predicate function is 'false'. Since node N7 is filtered out, all its child nodes, i.e., node N10, can be filtered out (although its predicate function is 'true'). Since all child nodes of node N5, i.e., nodes N8 and N9, are filtered out, node N5 can also be filtered out (although its predicate function is 'true').

As stated above, FIG. 8b illustrates an exemplary combination of the AND-filter all levels filtering mechanism with a level-filter filtering mechanism. This combined filtering mechanism can be implemented by starting with the root node as the current node.

If AND-predicate of current node='false', then exit;
  Reduce level by '1' (=current level);
  Determine all child nodes of the current node;
  If there are no child nodes, then check if there is a predicate function set for at least one of the lower levels of the current node;
    If this is the case, then exit;
    Otherwise, return current node;
  For all child nodes of the current node: Retrieve all nodes by applying this logic recursively for every child node of the current node with the current level;
  If there are nodes returned from these child nodes (=valid nodes), then return current node and return valid child nodes if given level is greater '0'.

As shown in FIG. 8b, the combined AND-filter all levels with the level-filter can operate as follows (an exemplary pseudo-code illustrating this logic is attached hereto as Appendix E2):

nodes N7 and N9 are filtered out (shown as crossed-out in FIG. 8b) because the predicate function is 'false';
  since nodes N4 and N6 (at level 2) are not at the lowest level and there is a predicate function set for a lower level, i.e., for level 3, the nodes N4 and N6 are filtered out;
  since node N7 is filtered out, all its child nodes, i.e., node N10 (although its predicate function is 'true'), are filtered out;
  since all child nodes of node N3, i.e., nodes N6 and N7, are filtered out, the node
  N3 is also filtered out (although its predicate function is not set).

Figure 8C:
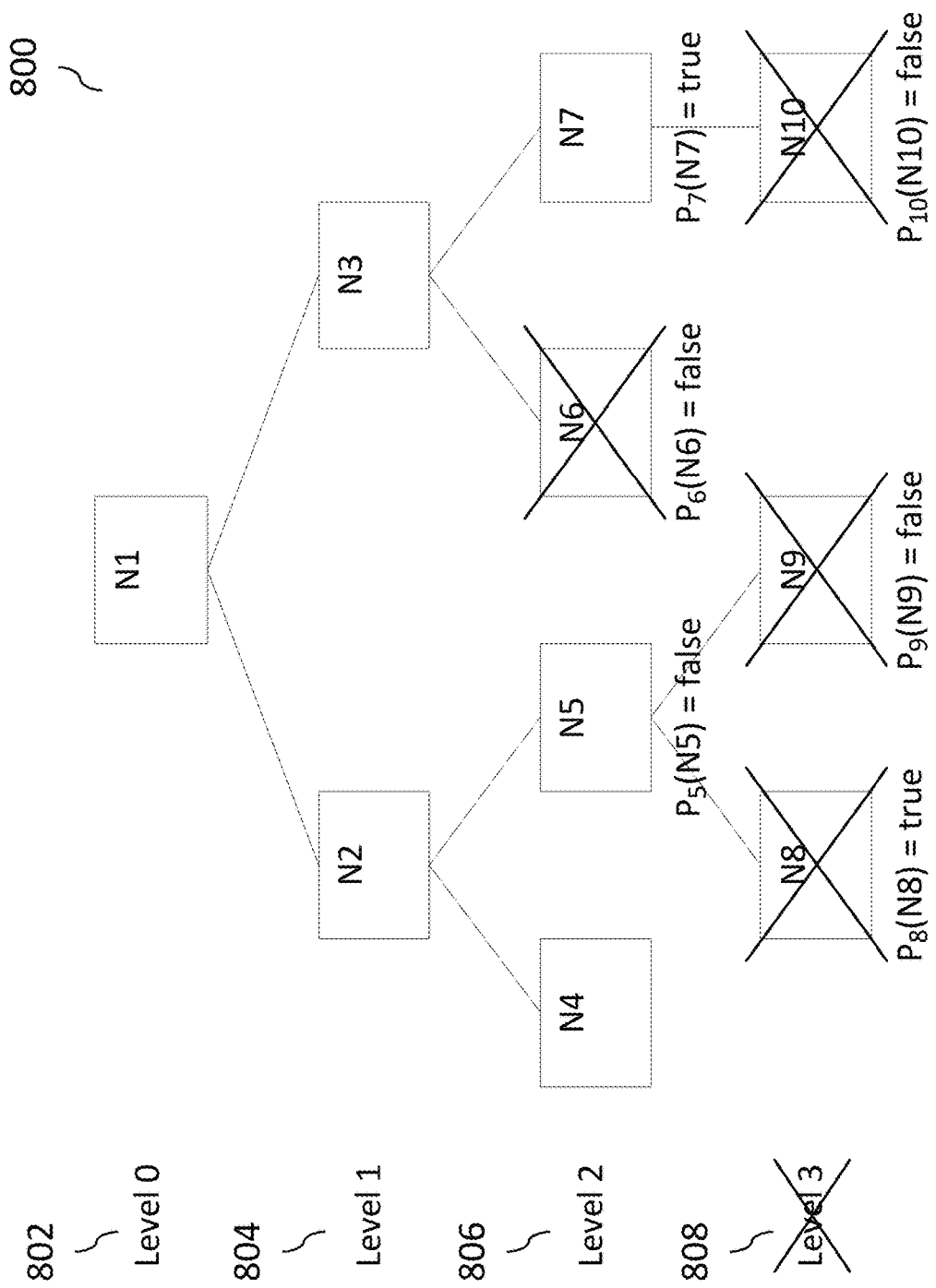
Figure 8D:
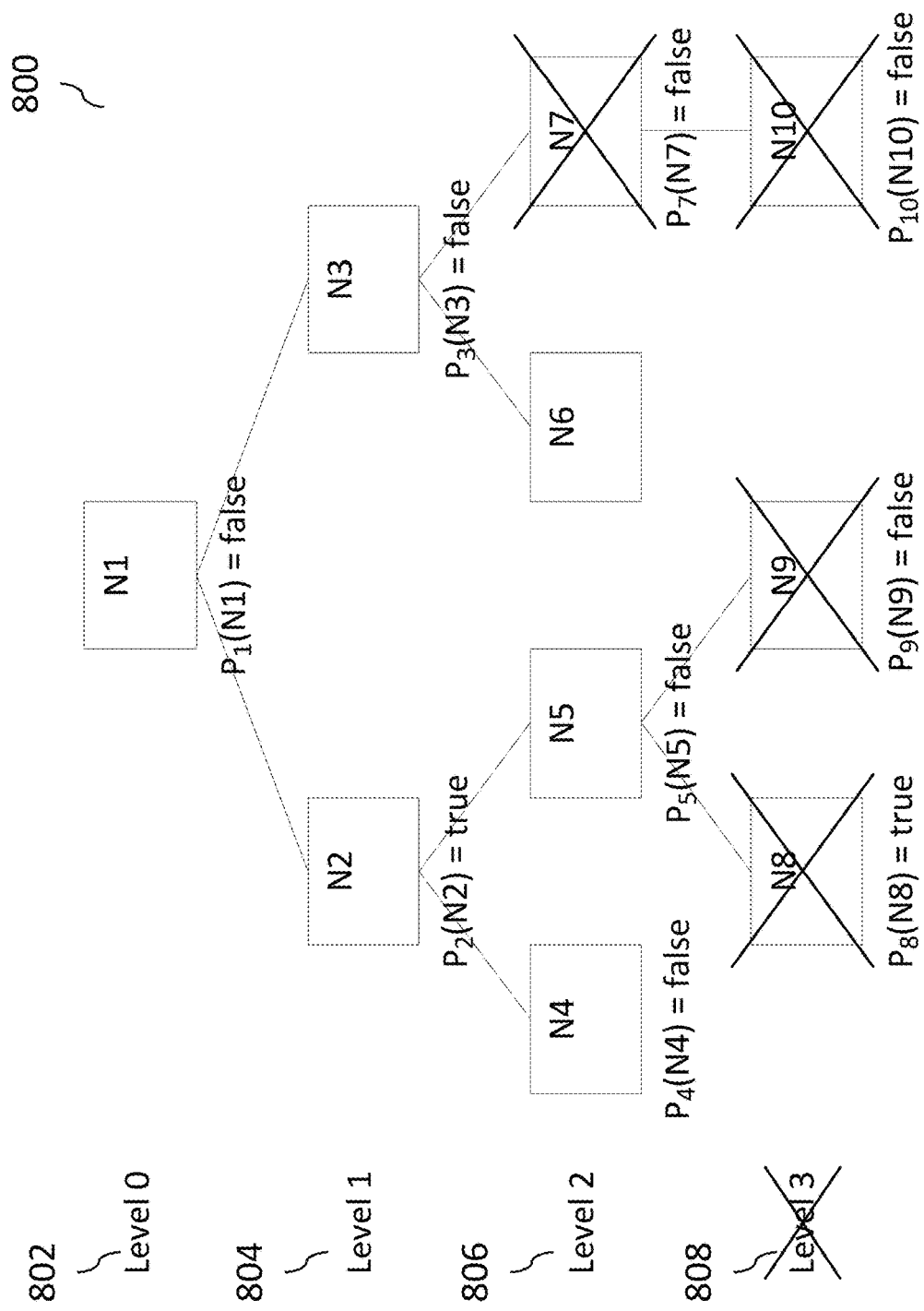

Referring to FIGS. 8c-d, a combined OR-filter and level-filter filtering mechanism is illustrated. In some implementations, the OR-filter can be applied first and then the level-filter can be applied on the result of the OR-filter. FIG. 8c illustrates an exemplary combination of OR-filter partial paths with a level-filter filtering mechanism. FIG. 8d illustrates an exemplary combination of OR-filter complete paths with a level-filter filtering mechanism.

Referring to FIG. 8c, a combination of OR-filter partial paths and level-filter can be implemented by starting with the root node as the current node:

Return current node;
  If AND-predicate of current node='false', then exit;
  Reduce level by '1' (=current level);
  Determine all child nodes of the current node;
  If there are no child nodes, then exit;
  For all child nodes of the current node: Retrieve all nodes by applying this logic recursively for every child node of the current node with the current level;
  If there are nodes returned from these child nodes (=valid nodes), then return these nodes and the current node;
  Otherwise, return current node if the OR-predicate of the current node is 'true'.

As shown in FIG. 8c, the combined OR-filter partial paths with the level-filter can operate as follows (an exemplary pseudo-code illustrating this logic is attached hereto as Appendix E3):

nodes N1, N2, N3, N4, N7 and N8 are not filtered out (not shown as cross-out in FIG. 8c) because these nodes do not have a predicate function set or the predicate function is 'true';
  because the node N8 is not filtered out, all its parent nodes are also not filtered out, i.e., nodes N5 (although its predicate function is 'false'), N2 and N1 are not filtered out.

Referring to FIG. 8d, an OR-filter complete paths filtering mechanism can be combined with the level-filter filtering mechanism. This combined filtering mechanism can be operate as follows, starting at the root node as the current node:

If given level='0' and if there is no OR-predicate function set, then return current node and exit;
  Reduce level by '1' (=current level);
  Determine all child nodes of the current node;
  If there are no child nodes and if the OR-predicate of the given node is 'true' or there is a parent node which has an OR-predicate with value 'true' ('Collect all child nodes'-flag), then return given node and exit;
  If the OR-predicate of the given node is 'true' or if the given 'Collect all child nodes'-flag is set, then set (local) 'Collect all child nodes'-flag;
  For all child nodes of the current node: Retrieve all nodes by applying this logic recursively for every child node of the current node and with the (local) 'Collect all child nodes'-flag;
  If there are nodes returned from these child nodes (=valid nodes), then return current node and return valid child nodes if given level is greater '0';
  Otherwise, return current node if the OR-predicate of the current node is 'true'.

As shown in FIG. 8d, the combined OR-filter complete paths with the level-filter can operate as follows (an exemplary pseudo-code illustrating this logic is attached hereto as Appendix E4):

nodes N2, N6 and N8 are not filtered out (not shown as crossed-out in FIG. 8d) because these nodes do not have a predicate function set or the predicate function is 'true';
  all parent nodes and all child nodes of these nodes, i.e., the nodes N1, N3, N4, N5 and N9, are also not filtered out (although the predicate functions of these nodes are 'false');

nodes N7 and N10 are filtered out (shown as cross-out in FIG. 8d) because these nodes do not have parent nodes or child nodes for which the predicate function is set or this predicate function is 'true'.

Figure 8E:
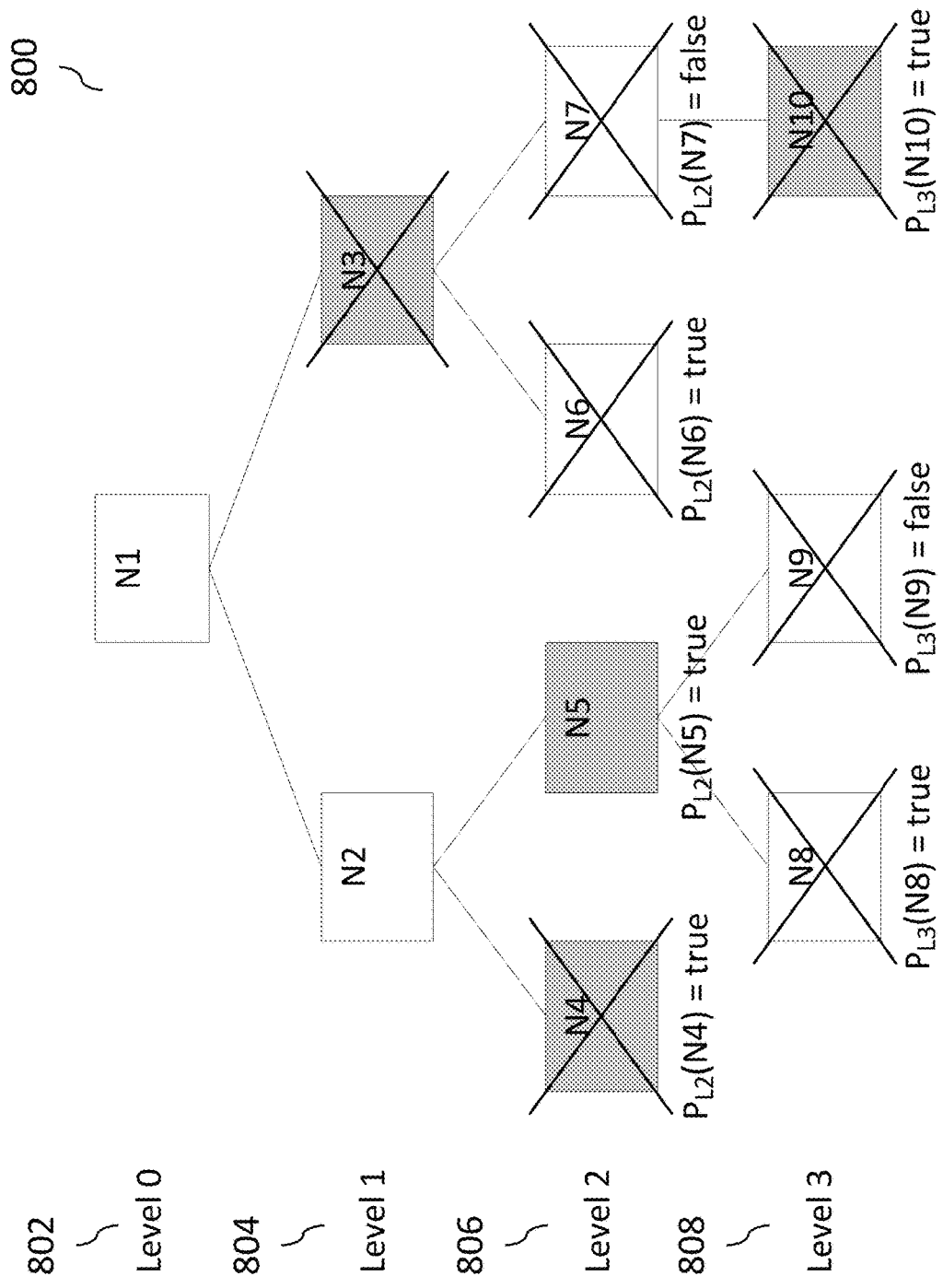

FIG. 8e illustrates an exemplary combination of an AND-filter all levels filtering mechanism with an OR-filter partial paths filtering mechanism. This combined filter can operate as follows, starting at the root node as the current node:

If AND-predicate of current instruction='false', set "Children-filtered-out"-flag, return this flag and exit. Determine all child nodes of the current node;
If there are no child nodes, then check if there is a predicate function set for at least one of the lower levels of the current node;
  If so, then:
    If the level of the current instruction=maximum number of levels, then return current instruction if there is no OR-predicate function set (at any hierarchy level) or if the OR-Predicate function of the given instruction is 'true';
    Otherwise:
      If there is a predicate function set for at least one of the lower levels of the current node, then set "Children-filtered-out"-flag;
      Otherwise: If there is no OR-predicate function set (at any hierarchy level) or if the OR-Predicate function of the given instruction is 'true', then return current instruction;
  Otherwise: If there is no OR-predicate function set (at any hierarchy level) or if the OR-Predicate function of the given instruction is 'true', then return current instruction;
For all child nodes of the current node: Retrieve all nodes by applying this logic recursively for every child node of the current node with the current level. Check if all child nodes are filtered out (by the AND-predicates). If so, then set "Children-filtered-out"-flag;
If there are nodes returned from these child nodes (=valid nodes), then return current node and return valid child nodes;
If there is no OR-predicate function set (at any hierarchy level), then: If there are nodes returned from these child nodes (=valid nodes), then return current node and return valid child nodes;
Otherwise: If there are nodes returned from these child nodes (=valid nodes), then return current node and return valid child nodes. Otherwise: If there is no OR_predicate function set (at any hierarchy level) or if the OR-Predicate function of the given instruction is 'true', then do not return current instruction, otherwise return current instruction;
Return all retrieved valid nodes and return "Children-filtered-out"-flag.

As shown in FIG. 8e, the combined AND-filter all levels with the OR-filter partial paths can operate as follows. In FIG. 8e, predicate functions of the AND-Filter are shown by $P_{Level}$(Node) and predicate functions of the OR-Filter are indicated by the following: no shading indicates that OR-predicate function of this node is set to 'false' or not set and shading indicates that OR-predicate function of this node is set to 'true'. The operation is as follows (an exemplary pseudo-code illustrating this logic is attached hereto as Appendix E5):

nodes N7 and N9 are filtered out because the predicate function is 'false';
since nodes N4 and N6 (at level 2) are not at the lowest level and there is a predicate function set for a lower level, i.e., for level 3, the nodes N4 and N6 are filtered out (although the OR-predicate function and the AND-predicate function of node 4 is 'true' and although the AND-predicate function of node 6 is 'true');
since node N7 is filtered out, all its child nodes, i.e., node N10 (although its predicate function is 'true'), are filtered out;
since all child nodes of node N3, i.e., nodes N6 and N7, are filtered out, node N3 is also filtered out (although its OR-predicate function is 'true');
node N5 is not filtered out because its AND-predicate function is 'true' and its OR-predicate function is 'true';
nodes N1 and N2 are not filtered out because the node N5 is not filtered out.

Figure 8F:
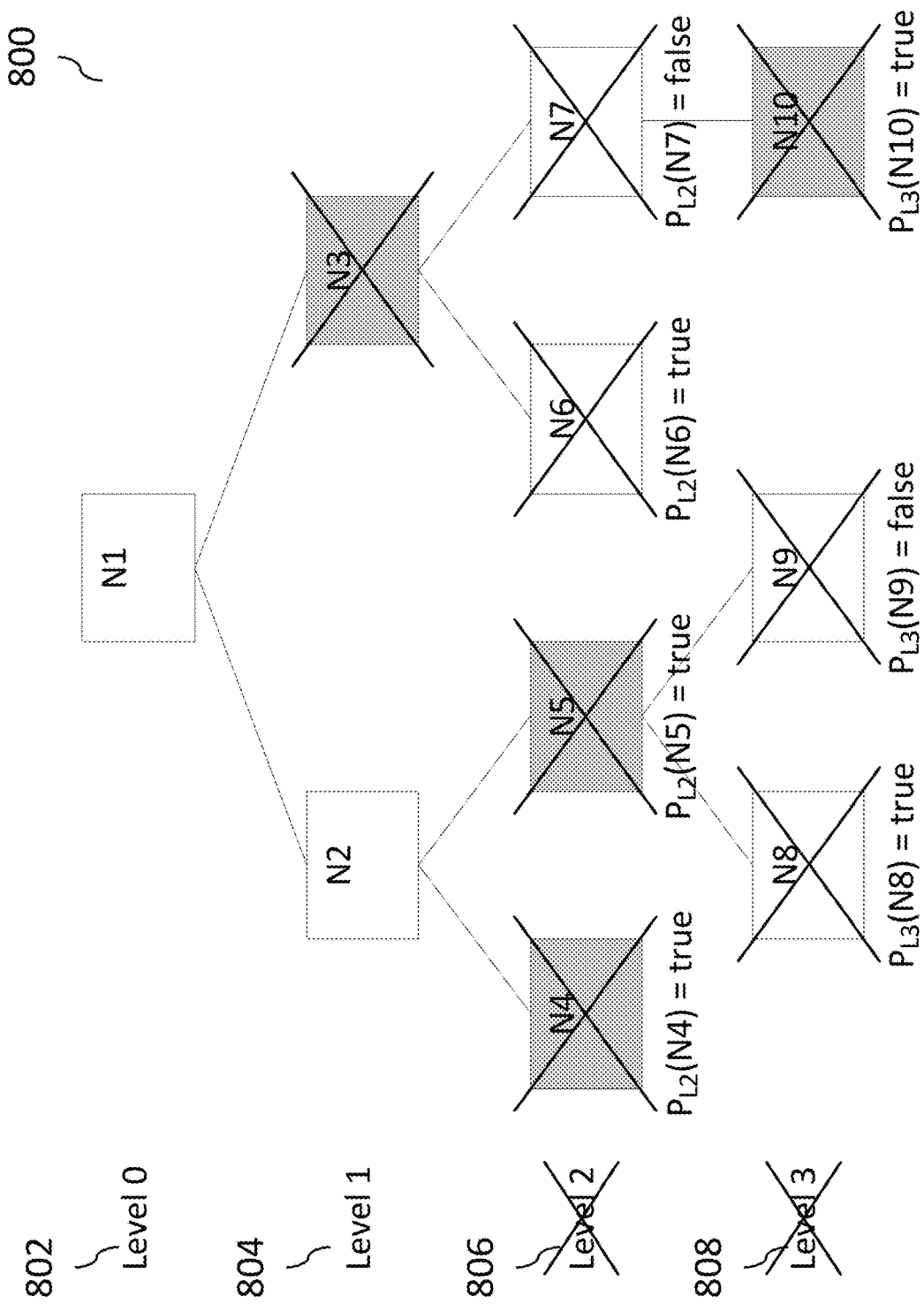

FIG. 8f illustrates an exemplary combination of an AND-filter all levels filtering mechanism, an OR-filter partial paths filtering mechanism and a level-filter filtering mechanism that operates by applying the AND-filter, the OR-filter and the level-filter in this sequence. This combined filter can operate as follows, starting at the root node as the current node:

If AND-predicate of current node='false', set "Children-filtered-out"-flag, return this flag and exit;
If the given level is '0' and if there is no AND-predicate function set and if there is no OR-predicate function set, then return current node and exit;
Reduce level by '1' (=current level);
Determine all child nodes of the current node;
If there are no child nodes, then check if there is a predicate function set for at least one of the lower levels of the current node;
  If so, then:
    If the level of the current node=maximum number of levels, then return current node if there is no OR-predicate function set (at any hierarchy level) or if the OR-Predicate function of the given node is 'true';
    Otherwise:
      If there is a predicate function set for at least one of the lower levels of the current node, then set "Children-filtered-out"-flag;
      Otherwise: If there is no OR-predicate function set (at any hierarchy level) or if the OR-Predicate function of the given node is 'true', then return current node;
  Otherwise: If there is no OR-predicate function set (at any hierarchy level) or if the OR-Predicate function of the given node is 'true', then return current node;
For all child nodes of the current node: Retrieve all nodes by applying this logic recursively for every child node of the current node with the current level. Check if all child nodes are filtered out (by the AND-predicates). If so, then set "Children-filtered-out"-flag;
If there are nodes returned from these child nodes (=valid nodes), then return current node and return valid child nodes;
If there is no OR-predicate function set (at any hierarchy level), then: If there are nodes returned from these child nodes (=valid nodes), then return current node and return valid child nodes if given level is greater '0';
Otherwise: If there are nodes returned from these child nodes (=valid nodes), then return current node and return valid child nodes if given level is greater '0'. Otherwise: If there is no OR-predicate function set (at any hierarchy level) or if the OR-Predicate function of the given node is 'true', then do not return current node, otherwise return current node;

Return all retrieved valid nodes and return "Children-filtered-out"-flag.

As shown in FIG. 8f, the combined AND-filter all levels filtering mechanism, OR-filter partial paths filtering mechanism and a level-filter filtering mechanism can operate as follows. Assuming that the given filter level is '1' (an exemplary pseudo-code illustrating this logic is attached hereto as Appendix E6):

nodes N1 and N2 are not filtered out because they belong to levels up to the given level '1' and they are not filtered out by the AND-filter or the OR-filter;

node N3 is filtered out because all child nodes of node N3, i.e., nodes N6 and N7, are filtered out (although node N3 belongs to level '1');

node N5 is filtered out because they belong to a lower level (although is not filtered out by the AND-filter and by the OR-filter);

nodes N4, N6, N7, N8, N9 and N10 are filtered out because they belong to a lower level and because they are filtered out by the AND-filter or by the OR-filter.

As stated above with regard to FIGS. 1-3, the attribute value derivation can provide rule based mapping and derivation of data, where the rules allow mapping and deriving values for target attributes based on values of source attributes including an inheritance logic using default values. The AVD provides a user interface to maintain values in a hierarchical set of rules, i.e., instructions, defined for source attribute value combinations. The user interface can allow filtering of rules using a given selection criteria, filtering by directly maintained values, and expanding the tree of source attributes to a particular level. These functionalities can be accomplished using various recursive filter algorithms.

In some implementations, attribute value derivation can be implemented as a business object which can include methods to initialize the business object, to load the data, to change the instruction data, to derive the target attribute values, to filter the instruction data, etc. The business object can be independent of the user interface to maintain the AVD instruction set and/or to derive the target attribute values. The user interface can use public methods of the business object to, for example, change the instruction data. The business object can run on a computer system and the user interface can communicate with the business object by calling the methods. The user interface can run on the same computer system or runs on a different computer system and calls the public methods remotely. Business objects can include methods for filtering instructions by different filtering criteria. These methods can implement the filtering functions using recursive filter algorithms discussed above. The user interface can allow actions and/or other functions to be set and apply these filters and call corresponding methods of business objects which can return results of the filtered instructions.

In some implementations, the user interface can provide at least one of following filter functions: source attribute filter, filter for directly maintained value, and expanding the source attribute tree function. The source attribute filter can include selection criteria which can be defined for every source attribute. Applying this filter, all instructions are shown where the source attribute values fit to the given source attribute selection criteria. Using filter for directly maintained values, all instructions are shown which have at least one directly maintained value. Further, all corresponding upper level instructions up to the default instruction can be shown. Using the expanding the source attribute tree instructions, the source attribute tree can be expanded to any level of the source attribute hierarchy, then, only those instructions are shown which belong to a level down to the given level and the default instruction is always shown. In some implementations, these filters can be applied in combination.

In some implementations, the filters of the attribute value derivation can include at least one of the following: a source attribute filter, a filter for directly maintained values, an expanding the source attribute tree function, and a default instruction. The source attribute filter can correspond to the AND-filter where selection criteria of the source attributes can be the predicate functions of the level of the corresponding source attribute. The filter for directly maintained values can correspond to the OR-filter where the predicate function of all instructions of all levels can be defined by the flag if the data of the node (i.e., the instruction) has at least one directly maintained value for the given target attributes. The expanding the source attribute tree function can correspond to the level filter where the default instruction (as the root node) has level '0'. The default instruction of the AVD instruction set, i.e., the root node of the hierarchy, can be always returned.

FIG. 9 illustrates an exemplary user interface of AVD instruction set 900 that includes filters, according to some implementations of the current subject matter. The filters that are included in the AVD instructions set 900 (shown at the bottom half of the instruction set 900) can include a filter to show only the directly maintained values (i.e., a filter to show only instructions with manually defined values), a filter for source attributes (i.e., "Source Attribute A: Selection Criteria for Source Attribute A", "Source Attribute B: Selection Criteria for Source Attribute B", and "Source Attribute C: Selection Criteria for Source Attribute C") and an expand function to expand the tree up to a selected source attribute. Results of these filters are shown in the bottom half of FIG. 9.

Application of the filter to show only instructions with directly maintained values can result in target attribute values corresponding to Instruction 1, Instruction 4, Instruction 5, and Instruction 10 that indicate (i.e., those that are shown in bold in FIG. 9, i.e., "Trg. Attrib. Value 1", "Trg. Attrib. Value 2", "Trg. Attrib. Value 3", and "Trg. Attrib. Value 4", respectively) and their corresponding upper level instructions. Application of the filter for source attributes results in instructions and values corresponding only to the source attributes A, B, and C. The resulting set can be expanded up to a specific selected source attribute, e.g., Source Attribute C.

In some implementation, a filter mechanism of the attribute value derivation can include a combination of AND-filter all levels filtering mechanism, OR-filter partial paths filtering mechanism and level-filter filtering mechanism. The filter mechanism of the AVD instruction set can operate as follows, starting at the default instruction (i.e., root node) as the current node (an exemplary pseudo-code illustrating this logic is attached hereto as Appendix F1):

If the AND-predicate of current instruction='false', set "Children-filtered-out"-flag, return this flag and exit;

If the given level is '0' and if there is no AND-predicate function set and if there is no OR-predicate function set, then return current instruction and exit;

Reduce level by '1' (=current level);

Determine all child nodes of the current node;

If there are no child nodes, then check if there is a predicate function set for at least one of all nodes;

If so, then:
 If the level of the current instruction='0', then return this instruction (default instruction);
 If the level of the current instruction=maximum number of levels, then return current instruction if there is no OR-predicate function set (at any hierarchy level) or if the OR-Predicate function of the given instruction is 'true';
 Otherwise:
  If there is a predicate function set for at least one of the lower levels of the current node, then set "Children-filtered-out"-flag;
   Otherwise: If there is no OR-predicate function set (at any hierarchy level) or if the OR-Predicate function of the given instruction is 'true', then return current instruction;
 Otherwise: If there is no OR-predicate function set (at any hierarchy level) or if the OR-Predicate function of the given instruction is 'true', then return current instruction;
For all child nodes of the current node: Retrieve all nodes by applying this logic recursively for every child node of the current node with the current level. Check if all child nodes are filtered out (by the AND-predicates). If so, then set "Children-filtered-out"-flag;
If there is no OR-predicate function set (at any hierarchy level), then: If there are nodes returned from these child nodes (=valid nodes), then return current node and return valid child nodes if given level is greater '0';
Otherwise: If there are nodes returned from these child nodes (=valid nodes), then return current node and return valid child nodes if given level is greater '0'. Otherwise: If there is no OR-predicate function set (at any hierarchy level) or if the OR-Predicate function of the given instruction is 'true', then do not return current instruction, otherwise return current instruction;
Return all retrieved valid nodes and return "Children-filtered-out"-flag.

Figure 10A:
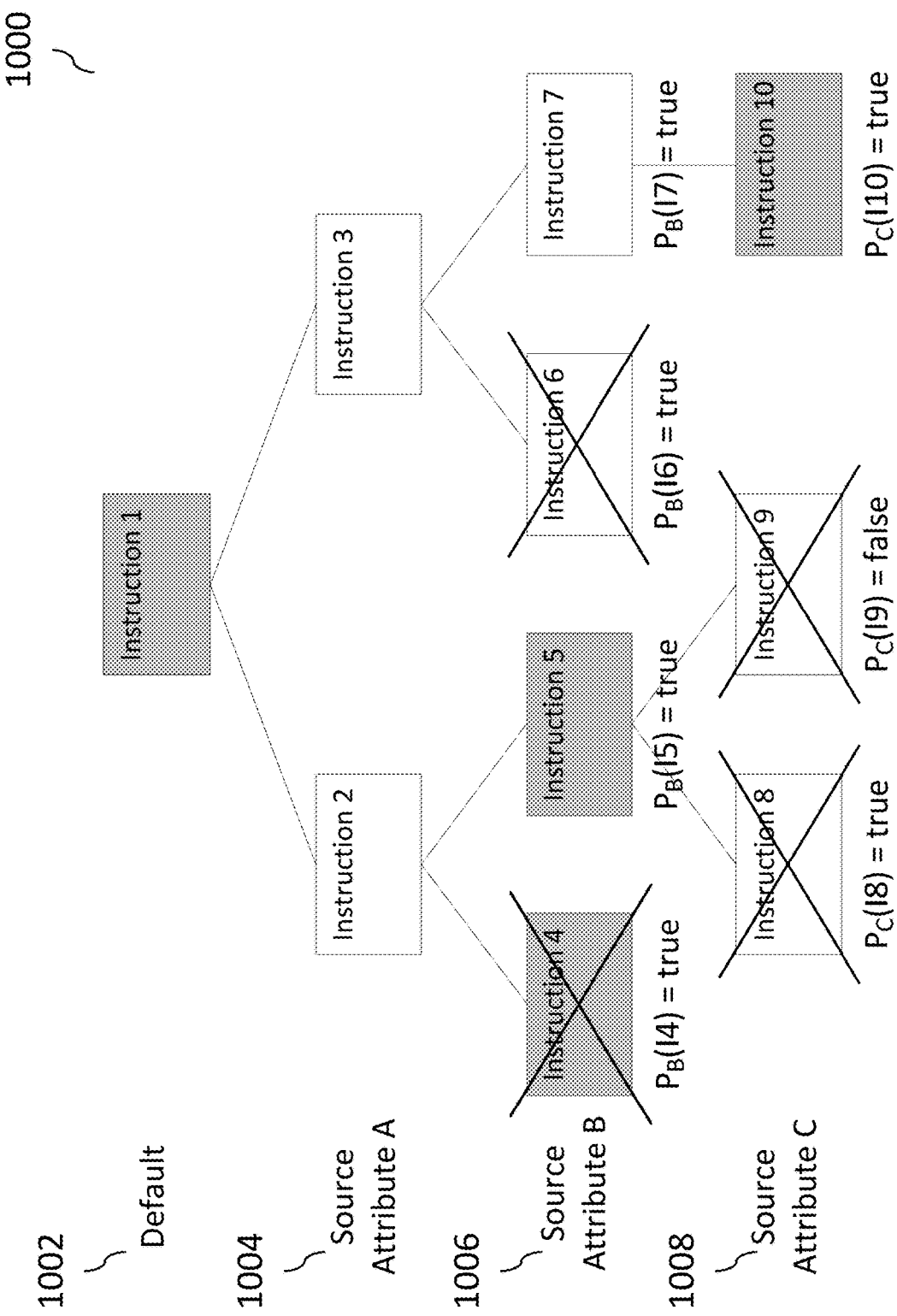
Figure 10C:
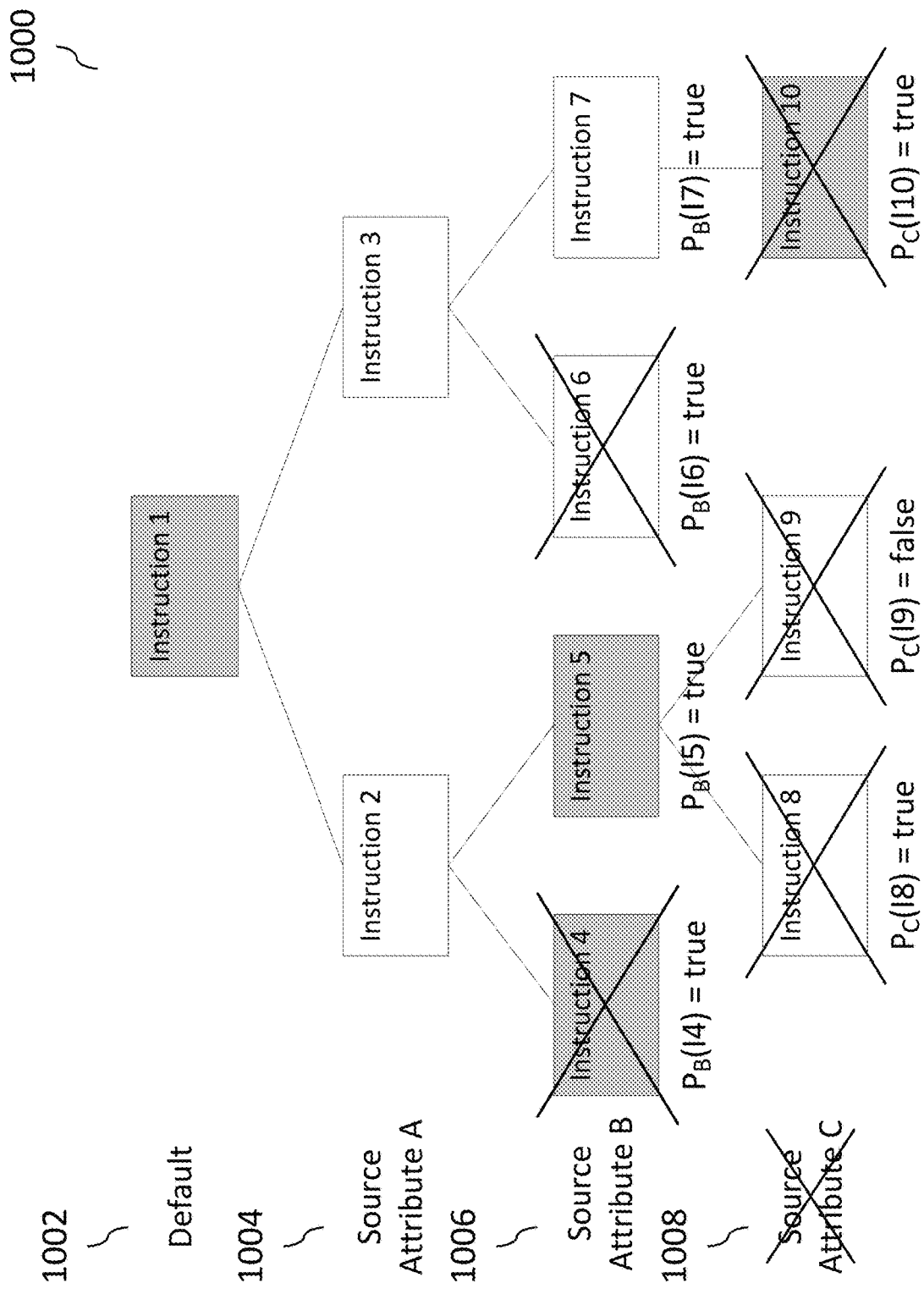

FIGS. 10a-d illustrate exemplary implementations of the above filtering mechanism logic to the AVD instruction set 900 shown in FIG. 9, according to some implementations of the current subject matter. The logic can be applied in a hierarchical data model 1000, according to some implementations of the current subject matter. As shown in FIGS. 10a-10c, the data model 1000 can include a default instruction 1002 (i.e., a default instruction 1), source attribute A instructions 1004 (i.e., instructions 2 and 3), source attribute B instructions 1006 (i.e., instructions 4 and 6, and instructions 5 and 7), and source attribute C instructions 1008 (i.e., instructions 8, 9, and 10). As shown in FIG. 10a, the predicate functions of instructions 4-8 and 10 are set to 'true' and prediction function of instruction 9 is set to false. FIG. 10a illustrates application of source attribute filter and a filter for directly maintained values and FIG. 10b illustrates a resulting user interface 1010.

Figure 10D:
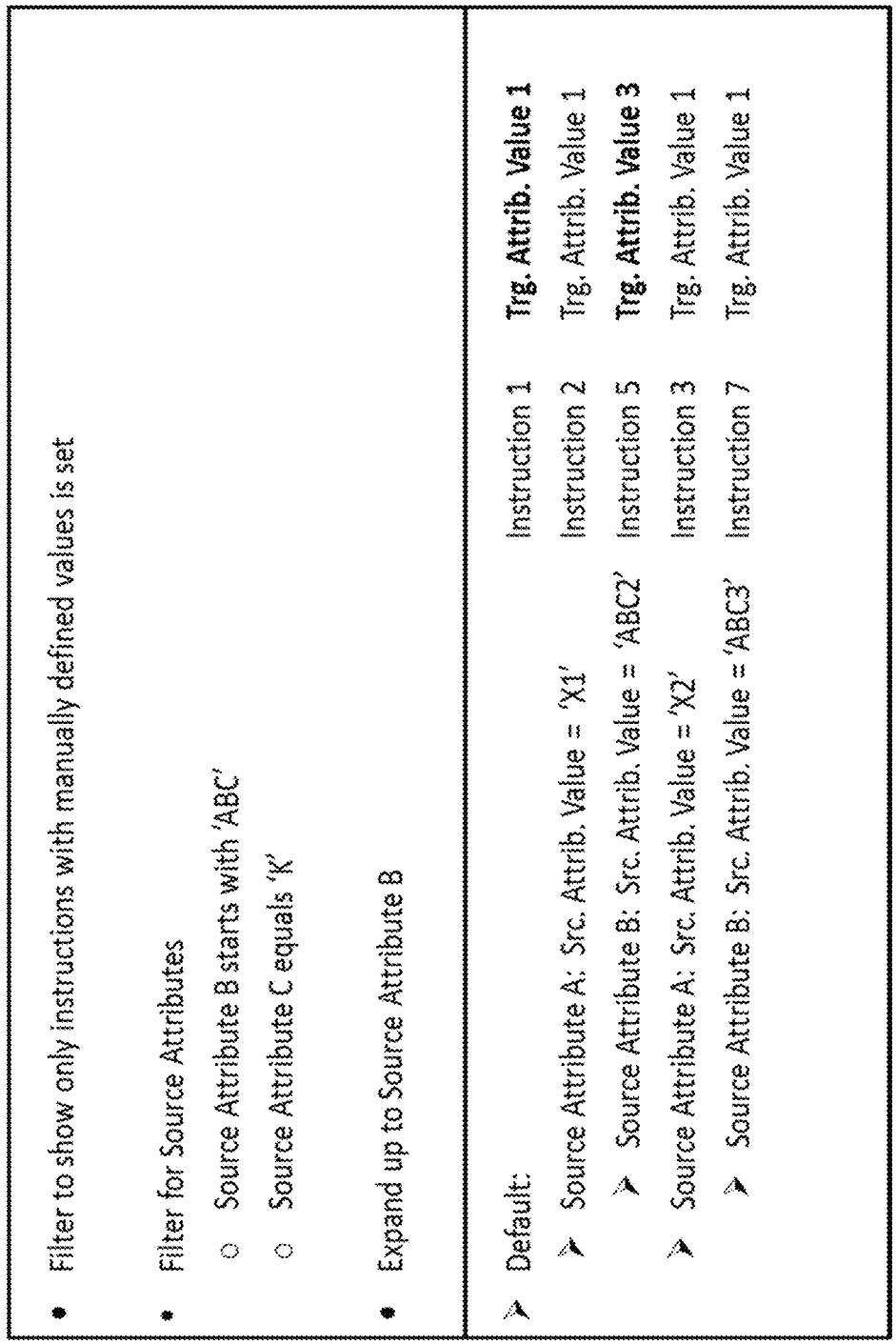

FIG. 10c illustrates an expanding function of the source attribute tree in addition to the filters shown in FIG. 10b and FIG. 10d illustrates a resulting user interface 1020.

Referring to FIGS. 10a-b, the top part of the user interface 1010 shows filters that are being applied, i.e., a first filter to show only instruction with manually defined values and a second filter for source attributes (i.e., "Source Attribute B starts with 'ABC'" and "Source Attribute C equals K"). Thus, the first filter results in "Trg. Attrib. Value 1", "Trg. Attrib. Value 2", "Trg. Attrib. Value 3", and "Trg. Attrib. Value 4" corresponding to instructions 1, 4, 5, and 10, respectively and their corresponding upper level instructions 2, 3, and 7 (as shown in FIG. 9). However, once the second filter is applied, directly maintained target attribute values 1, 3, and 4 corresponding to instructions 1, 5, and 10 and their corresponding upper level instructions 2, 3, and 7 are shown. This is because the second filter includes a first part that limits the data set to Source Attribute B that starts with ABC and a second part that limits the data set to Source Attribute C that equals K. As shown in FIG. 10b, these are "Source Attribute B: Src. Attrib. Value='ABC2' corresponding to instruction 5 and "Source Attribute C: Src. Attrib. Value='K' corresponding to instruction 10.

Referring to FIGS. 10c-d, the filtering mechanism user interface 1020 can include an additional filter of expanding up to Source Attribute B. As shown in FIG. 10d, the resulting data set is smaller than the data set shown in the user interface 1010 of FIG. 10b. As a result of this filter, only source attributes A and B are shown and source attribute C and its corresponding instructions are filtered out. Hence, "Source Attribute C: Src. Attrib. Value='K' corresponding to instruction 10 is removed from the resulting data set.

FIGS. 11a-c illustrate exemplary applications of the AVD instructions set filtering mechanism, according to some implementations of the current subject matter. In these examples, the source attribute hierarchy of the AVD instruction set can include three source attributes 'Product Group', 'Product Category', and 'Product Subcategory'. The target attribute can be 'Material Group'. FIG. 11a illustrates an entire unfiltered instruction set and filters that can be used in this filtering mechanism, i.e., filter to show only instructions with manually defined values, filter for source attributes (i.e., "Product Group: selection Criteria for Product Group", "Product Category: Selection Criteria for Product Category", and "Product Subcategory: Selection Criteria for Product Subcategory"), and a filter to expand up to a selected source attribute.

In the hierarchy, the source attribute of the default instructions can correspond to materials group target attribute "A1"; source attribute product group "X1" can correspond to the materials group target attribute "A1"; product category "ABC1" source attribute can correspond to target attribute "A2" and product category "ABC2" source attribute can correspond to target attribute "A3"; and so on, as shown in the user interface 1110 illustrated in FIG. 11a. Target attributes that are shown in bold in FIG. 11a are directly maintained (i.e., A1 corresponding to default source attribute; A2 corresponding to product category "ABC1" source attribute; A3 corresponding to product category "ABC2" source attribute; and A4 corresponding to product subcategory "K" under product group "X2" and product category "ABC3").

FIG. 11b illustrates a user interface 1120 that shows application of the filter to show only instructions with manually defined values and filter for source attributes (i.e., "product category starts with 'ABC'" and "product subcategory equals 'K'"). As shown in FIG. 11b, product categories and product subcategories that do not include directly maintained values are filtered out (i.e., "Product Category 'ABC1'" under "Product Group 'X1'"; both product subcategories under "Product Category 'ABC2'"; and "Product Category 'ABC1'" under "Product Group 'X2'").

FIG. 11c illustrates a user interface 1130 that shows application of a further filter of expanding up to Product Category in addition to the filters shown in FIG. 11b. As shown in FIG. 11c, "Product Subcategory 'K'" under "Product Category 'ABC3'" is filtered out.

Figure 12:
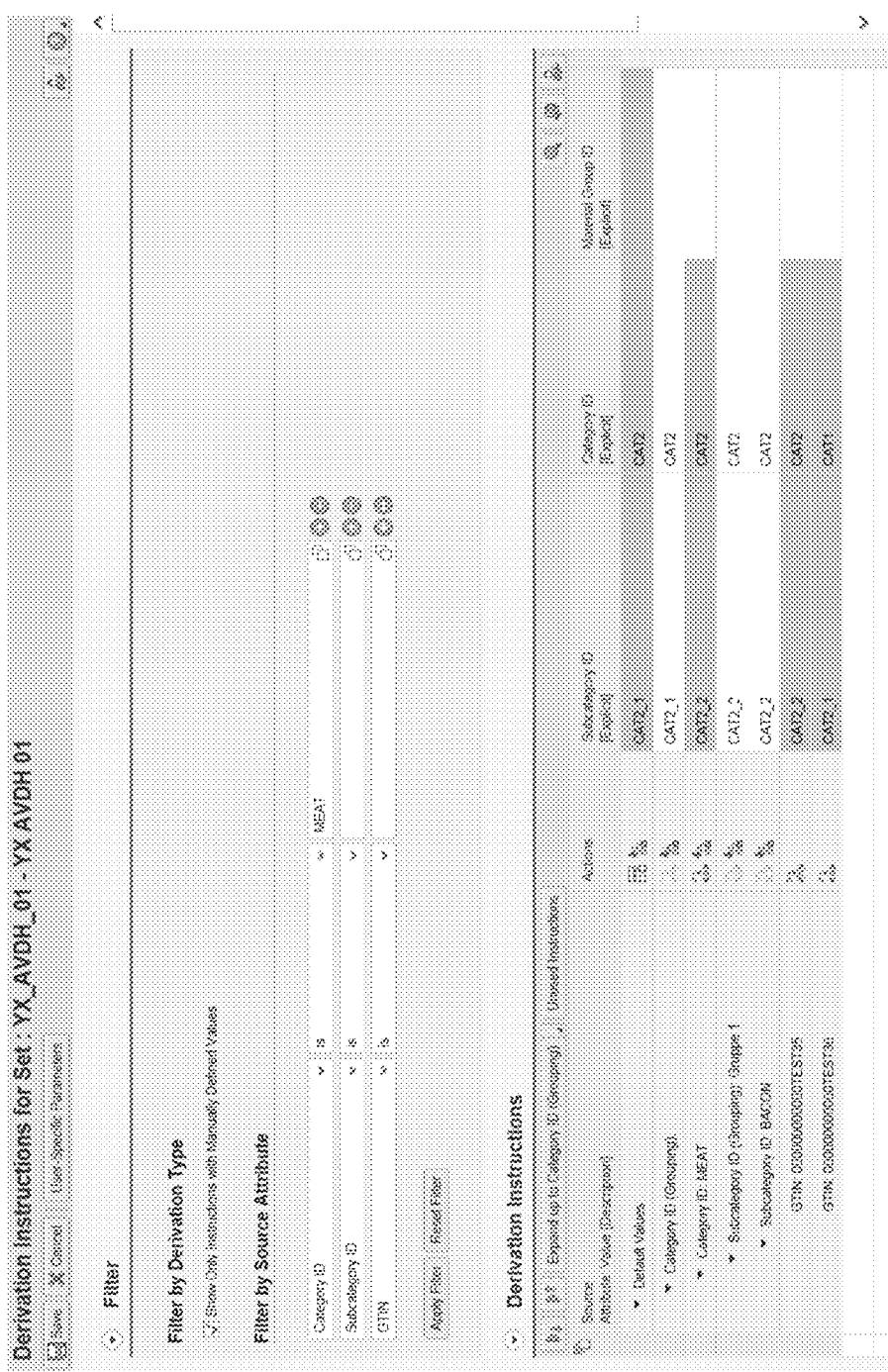
FIG. 12 illustrates an exemplary user interface for applying various filtering mechanisms, according to some implementations of the currently subject matter

FIG. 12 illustrates an exemplary user interface 1200 for applying various filtering mechanisms, according to some implementations of the currently subject matter. The top part of the user interface 1200 shows the filter of the manually maintained values and the filter for the source attributes. The bottom part of the user interface 1200 shows the instructions and the result of the filter logic. In this part of the user interface, expanding to a source attribute level function is shown (e.g. "Expand up to Category ID (Grouping)").

Figure 13:
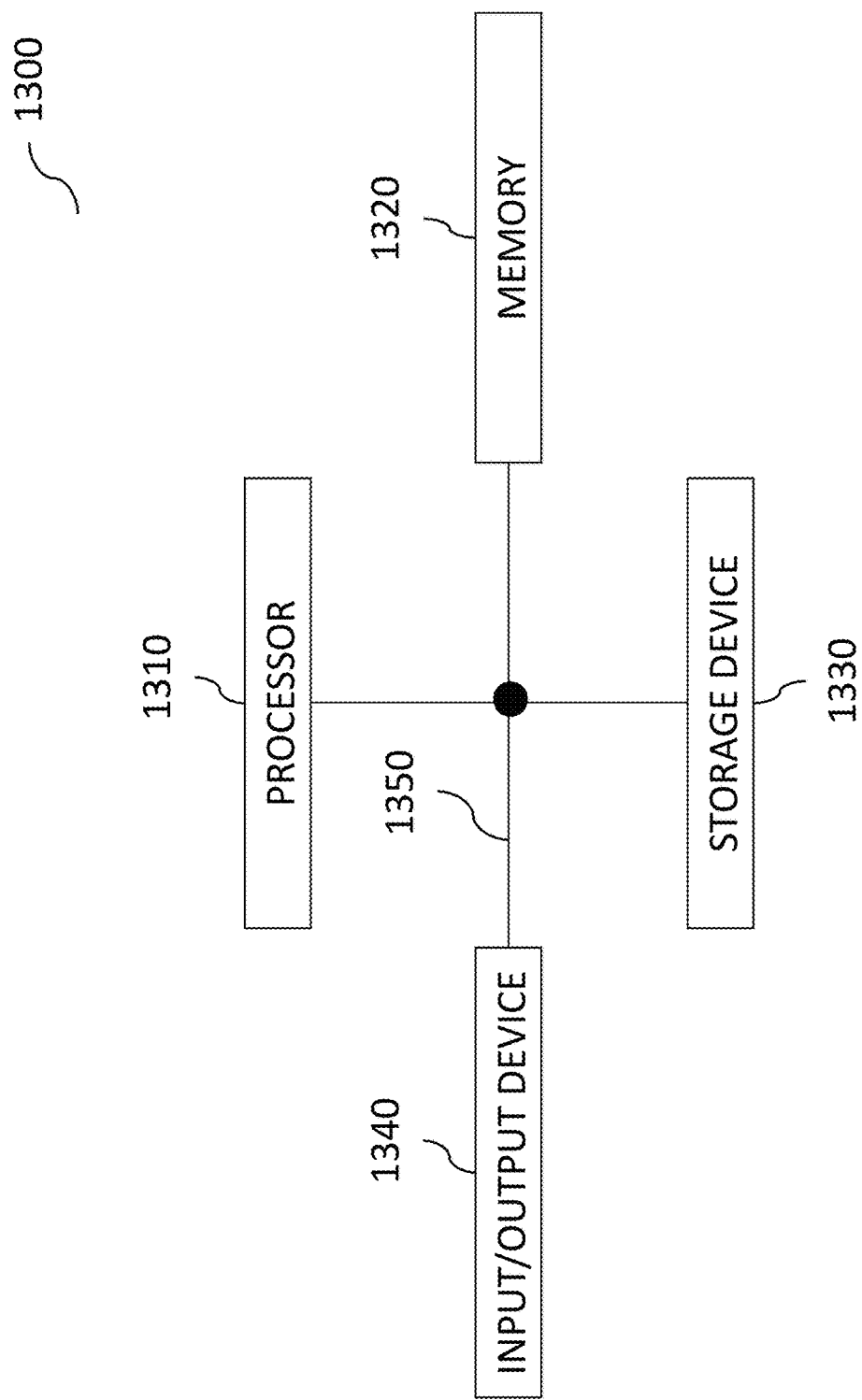
FIG. 13 is an exemplary system, according to some implementations of the current subject matter.

In some implementations, the current subject matter can be configured to be implemented in a system 1300, as shown in FIG. 13. The system 1300 can include a processor 1310, a memory 1320, a storage device 1330, and an input/output device 1340. Each of the components 1310, 1320, 1330 and 1340 can be interconnected using a system bus 1350. The processor 1310 can be configured to process instructions for execution within the system 1300. In some implementations, the processor 1310 can be a single-threaded processor. In alternate implementations, the processor 1310 can be a multi-threaded processor. The processor 1310 can be further configured to process instructions stored in the memory 1320 or on the storage device 1330, including receiving or sending information through the input/output device 1340. The memory 1320 can store information within the system 1300. In some implementations, the memory 1320 can be a computer-readable medium. In alternate implementations, the memory 1320 can be a volatile memory unit. In yet some implementations, the memory 1320 can be a non-volatile memory unit. The storage device 1330 can be capable of providing mass storage for the system 1300. In some implementations, the storage device 1330 can be a computer-readable medium. In alternate implementations, the storage device 1330 can be a floppy disk device, a hard disk device, an optical disk device, a tape device, non-volatile solid state memory, or any other type of storage device. The input/output device 1340 can be configured to provide input/output operations for the system 1300. In some implementations, the input/output device 1340 can include a keyboard and/or pointing device. In alternate implementations, the input/output device 1340 can include a display unit for displaying graphical user interfaces.

Figure 14:
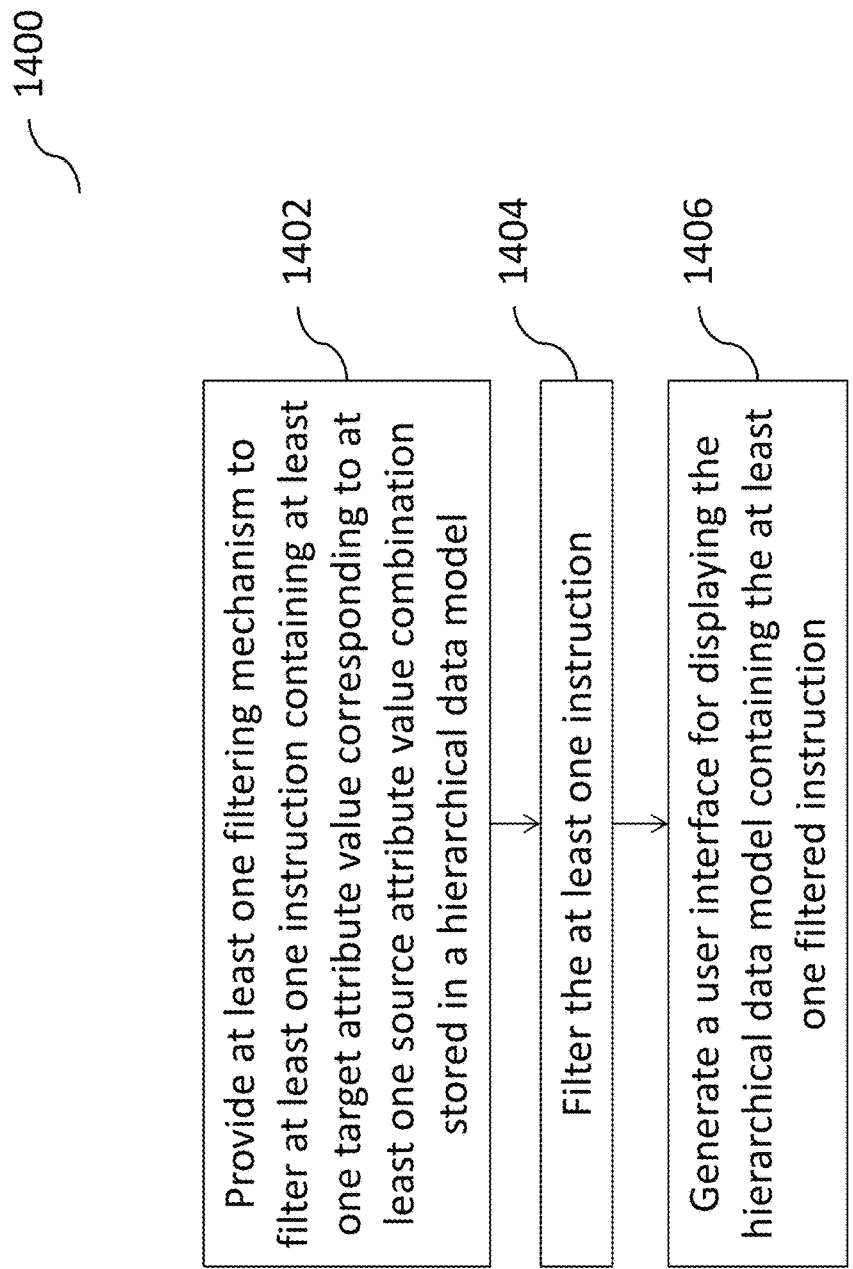
FIG. 14 is an exemplary method, according to some implementations of the current subject matter.

FIG. 14 illustrates an exemplary method 1400 for providing various filtering mechanisms of data stored in a hierarchical data model for use by an attribute value derivation, according to some implementations of the current subject matter. At 1402, at least one filtering mechanism can be provided to filter at least one instruction containing at least one target attribute value corresponding to at least one source attribute value combination stored in a hierarchical data model. At 1404, the instructions can be filtered using the at least one filtering mechanism. At 1406, a user interface can be generated and can display the hierarchical data model containing the filtered instructions.

In some implementations, the current subject matter can include one or more of the following optional features. The filtering mechanism can include at least one of the following: a filtering mechanism for displaying at least one directly maintained target attribute value, a filtering mechanism based on at least one source attributes, and a filtering mechanism for expanding a tree of source attributes up to a selected source attribute. The filtering mechanisms can be applied using a predetermined sequence.

In some implementations, the filtering mechanism can be based on at least one of the following algorithms. A first algorithm (which can be an AND-filter described above) for generating a path can retrieve at least one node in the hierarchical data model using a predicate function corresponding to the node. The path can contain a plurality of nodes and end in the at least one node, where each node in the plurality of nodes in the generated path has valid predicate functions. A second algorithm (which can be an OR-filter described above) for generating a path can also retrieve at least one node in the hierarchical data model using a predicate function corresponding to the node. Here, the path can also contain a plurality of nodes and end in the at least one node, but at least one node in the plurality of nodes in the generated path has a valid predicate function. A third algorithm (which can be a level filter described above) for retrieving at least one node in the hierarchical data model can be based on a level of the hierarchical data model containing the node. Any combination of these algorithms can be used to retrieve a node in the hierarchical data model.

In some implementations, the first algorithm can uses at least one of the following: predicate functions of nodes in the generated path containing the plurality of nodes and ending with the at least one node (which corresponds to AND-filter complete paths filtering mechanism), and predicate functions of all nodes on each level of the hierarchical data model, each level containing a node in the generated path (which corresponds to AND-filter all levels filtering mechanism). Using the first algorithm, a node is filtered out when a predicate function of that node has a false value.

In some implementations, the second algorithm can return at least one of the following: a partial path to the at least one node, the partial path containing a node having a predicate function with a true value (which corresponds to an OR-filter partial paths filtering mechanism), and a complete path to the at least one node, the complete path containing each node having a predicate function with a true value (which corresponds to an OR filter complete paths filtering mechanism).

In some implementations, a path generated using the third algorithm can contain nodes located on a plurality of levels in the hierarchical data model. Each level, preceding and inclusive of the level containing the at least one node, can contain nodes having predicate functions with a true value.

The generated user interface can display at least one of the following: the filtered source attribute, the source attribute value corresponding to the filtered source attribute, the source attribute description corresponding to the filtered one source attribute, and a filtered target attribute corresponding to the filtered source attribute.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   providing at least one filtering mechanism to filter at least one instruction containing at least one target attribute value derived based on at least one source attribute value combination stored in a hierarchical data model including a plurality of nodes storing data in a plurality of levels, the filtering mechanism uses a predicate function on a data stored in a node in the plurality of nodes and a level of the node in the plurality of nodes to return the at least one target attribute value in accordance with the at least one instruction, wherein each node in the plurality of nodes stores at least one upper level node instruction;
   filtering, using the at least one filtering mechanism, the at least one instruction; and
   generating a user interface for displaying the hierarchical data model containing the at least one filtered instruction;
   wherein the at least one of the providing, the filtering, and the generating is performed using at least one processor of at least one computing system.

2. The method according to claim 1, wherein the at least one filtering mechanism includes at least one of the following:
   a filtering mechanism for displaying at least one directly maintained target attribute value;
   a filtering mechanism based on at least one source attribute; and a filtering mechanism for expanding a tree of source attributes up to a selected source attribute;

wherein the filtering mechanisms are applied using a predetermined sequence.

3. The method according to claim 1, wherein the at least one filtering mechanism is based on at least one of the following:

a first algorithm for generating a path to retrieve at least one node in the hierarchical data model using a predicate function corresponding to the at least one node, the path containing a plurality of nodes and ending in the at least one node, each node in the plurality of nodes in the generated path having valid predicate functions;

a second algorithm for generating a path to retrieve at least one node in the hierarchical data model using a predicate function corresponding to the at least one node, the path containing a plurality of nodes and ending in the at least one node, at least one node in the plurality of nodes in the generated path having a valid predicate function;

a third algorithm for retrieving at least one node in the hierarchical data model based on a level of the hierarchical data model containing the at least one node; and any combination thereof.

4. The method according to claim 3, wherein the first algorithm uses at least one of the following:

predicate functions of nodes in the generated path containing the plurality of nodes and ending with the at least one node, and predicate functions of all nodes on each level of the hierarchical data model, each level containing a node in the generated path;

wherein a node is filtered out when a predicate function of that node has a false value.

5. The method according to claim 3, wherein the second algorithm returns at least one of the following:

a partial path to the at least one node, the partial path containing a node having a predicate function with a true value, and a complete path to the at least one node, the complete path containing each node having a predicate function with a true value.

6. The method according to claim 3, wherein a path generated using the third algorithm contains nodes located on a plurality of levels in the hierarchical data model, each level, preceding and inclusive of the level containing the at least one node, containing nodes having predicate functions with a true value.

7. The method according to claim 1, wherein the generated user interface displays at least one of the following: at least one filtered source attribute, the source attribute value corresponding to the at least one filtered source attribute, the source attribute description corresponding to the at least filtered one source attribute, and at least one filtered target attribute corresponding to the at least one filtered source attribute.

8. A system comprising:

at least one programmable processor; and a machine-readable medium storing instructions that, when executed by the at least one programmable processor, cause the at least one programmable processor to perform operations comprising:

providing at least one filtering mechanism to filter at least one instruction containing at least one target attribute value derived based on at least one source attribute value combination stored in a hierarchical data model including a plurality of nodes storing data in a plurality of levels, the filtering mechanism uses a predicate function on a data stored in a node in the plurality of nodes and a level of the node in the plurality of nodes to return the at least one target attribute value in accordance with the at least one instruction, wherein each node in the plurality of nodes stores at least one upper level node instruction;

filtering, using the at least one filtering mechanism, the at least one instruction; and generating a user interface for displaying the hierarchical data model containing the at least one filtered instruction.

9. The system according to claim 8, wherein the at least one filtering mechanism includes at least one of the following:

a filtering mechanism for displaying at least one directly maintained target attribute value;

a filtering mechanism based on at least one source attribute; and a filtering mechanism for expanding a tree of source attributes up to a selected source attribute;

wherein the filtering mechanisms are applied using a predetermined sequence.

10. The system according to claim 8, wherein the at least one filtering mechanism is based on at least one of the following:

a first algorithm for generating a path to retrieve at least one node in the hierarchical data model using a predicate function corresponding to the at least one node, the path containing a plurality of nodes and ending in the at least one node, each node in the plurality of nodes in the generated path having valid predicate functions;

a second algorithm for generating a path to retrieve at least one node in the hierarchical data model using a predicate function corresponding to the at least one node, the path containing a plurality of nodes and ending in the at least one node, at least one node in the plurality of nodes in the generated path having a valid predicate function;

a third algorithm for retrieving at least one node in the hierarchical data model based on a level of the hierarchical data model containing the at least one node; and any combination thereof.

11. The system according to claim 10, wherein the first algorithm uses at least one of the following:

predicate functions of nodes in the generated path containing the plurality of nodes and ending with the at least one node, and predicate functions of all nodes on each level of the hierarchical data model, each level containing a node in the generated path;

wherein a node is filtered out when a predicate function of that node has a false value.

12. The system according to claim 10, wherein the second algorithm returns at least one of the following:

a partial path to the at least one node, the partial path containing a node having a predicate function with a true value, and a complete path to the at least one node, the complete path containing each node having a predicate function with a true value.

13. The system according to claim 10, wherein a path generated using the third algorithm contains nodes located on a plurality of levels in the hierarchical data model, each level, preceding and inclusive of the level containing the at least one node, containing nodes having predicate functions with a true value.

14. The system according to claim 8, wherein the generated user interface displays at least one of the following: at least one filtered source attribute, the source attribute value corresponding to the at least one filtered source attribute, the source attribute description corresponding to the at least filtered one source attribute, and at least one filtered target attribute corresponding to the at least one filtered source attribute.

15. A computer program product comprising a non-transitory machine-readable medium storing instructions that, when executed by at least one programmable processor, cause the at least one programmable processor to perform operations comprising:

providing at least one filtering mechanism to filter at least one instruction containing at least one target attribute value derived based on at least one source attribute value combination stored in a hierarchical data model including a plurality of nodes storing data in a plurality of levels, the filtering mechanism uses a predicate function on a data stored in a node in the plurality of nodes and a level of the node in the plurality of nodes to return the at least one target attribute value in accordance with the at least one instruction, wherein each node in the plurality of nodes stores at least one upper level node instruction;

filtering, using the at least one filtering mechanism, the at least one instruction; and generating a user interface for displaying the hierarchical data model containing the at least one filtered instruction.

16. The computer program product according to claim 15, wherein the at least one filtering mechanism includes at least one of the following:

a filtering mechanism for displaying at least one directly maintained target attribute value;

a filtering mechanism based on at least one source attribute; and a filtering mechanism for expanding a tree of source attributes up to a selected source attribute;

wherein the filtering mechanisms are applied using a predetermined sequence.

17. The computer program product according to claim 15, wherein the at least one filtering mechanism is based on at least one of the following:

a first algorithm for generating a path to retrieve at least one node in the hierarchical data model using a predicate function corresponding to the at least one node, the path containing a plurality of nodes and ending in the at least one node, each node in the plurality of nodes in the generated path having valid predicate functions;

a second algorithm for generating a path to retrieve at least one node in the hierarchical data model using a predicate function corresponding to the at least one node, the path containing a plurality of nodes and ending in the at least one node, at least one node in the plurality of nodes in the generated path having a valid predicate function;

a third algorithm for retrieving at least one node in the hierarchical data model based on a level of the hierarchical data model containing the at least one node; and any combination thereof 18. The computer program product according to claim 17, wherein the first algorithm uses at least one of the following:

predicate functions of nodes in the generated path containing the plurality of nodes and ending with the at least one node, and predicate functions of all nodes on each level of the hierarchical data model, each level containing a node in the generated path;

wherein a node is filtered out when a predicate function of that node has a false value.

19. The computer program product according to claim 17, wherein the second algorithm returns at least one of the following:

a partial path to the at least one node, the partial path containing a node having a predicate function with a true value, and a complete path to the at least one node, the complete path containing each node having a predicate function with a true value.

20. The computer program product according to claim 17, wherein a path generated using the third algorithm contains nodes located on a plurality of levels in the hierarchical data model, each level, preceding and inclusive of the level containing the at least one node, containing nodes having predicate functions with a true value.

* * * * *